United States Patent [19]
James et al.

[11] Patent Number: 6,108,739
[45] Date of Patent: *Aug. 22, 2000

[54] METHOD AND SYSTEM FOR AVOIDING STARVATION AND DEADLOCKS IN A SPLIT-RESPONSE INTERCONNECT OF A COMPUTER SYSTEM

[75] Inventors: David V. James, Palo Alto; Donald N. North, Saratoga; Glen D. Stone, San Jose, all of Calif.

[73] Assignee: Apple Computer, Inc., Cupertino, Calif.

[ * ] Notice: This patent is subject to a terminal disclaimer.

[21] Appl. No.: 09/301,865

[22] Filed: Apr. 29, 1999

Related U.S. Application Data

[63] Continuation of application No. 08/705,324, Aug. 29, 1996, Pat. No. 5,961,623.
[51] Int. Cl.[7] .................................................. G06F 13/36
[52] U.S. Cl. ......................... 710/113; 710/241; 710/128; 710/129
[58] Field of Search ................... 710/113–125, 126–129, 710/240–244

[56] References Cited

U.S. PATENT DOCUMENTS

| | | | |
|---|---|---|---|
| 4,672,536 | 6/1987 | Giroir et al. | 710/241 |
| 4,682,282 | 7/1987 | Beasley | 710/244 |
| 5,220,653 | 6/1993 | Miro | 709/107 |
| 5,274,774 | 12/1993 | Manber et al. | 710/125 |
| 5,339,311 | 8/1994 | Turner | 370/394 |
| 5,402,423 | 3/1995 | Kersen et al. | 370/419 |
| 5,428,796 | 6/1995 | Iskiyan et al. | 710/240 |
| 5,463,624 | 10/1995 | Hogg et al. | 370/461 |
| 5,574,867 | 11/1996 | Khaira | 710/113 |

*Primary Examiner*—Ayaz R. Sheikh
*Assistant Examiner*—Sumati Lefkowitz
*Attorney, Agent, or Firm*—Sawyer Law Group

[57] ABSTRACT

A system and method for avoiding starvation and deadlocks in a split-response-bus multiprocessor computer system. The multiprocessor computer system includes a first node and a second node coupled to the a split-response bus, wherein the first and second nodes communicate by passing request packets over the split-response bus. The method and system includes providing precedence information in the request packets, and then using the precedence information when receiving the request packets to determine which request packets to process and which request packets to reject when a conflict occurs.

12 Claims, 25 Drawing Sheets

| Label | Label Description |
|---|---|
| SPLIT | Truly split-response requester (no servicing dependencies) |
| MIN | Lower precedence, towards-leaf access of half-duplex address |
| MID | Normal precedence, same-level PCI bridge communications |
| MAX | Higher precedence, towards-leaf access of full-duplex address |

| Request Type | Request Precedence | Duplex | Labeled Precedence | Row | Description |
|---|---|---|---|---|---|
| write | MIN | HALF | Min | 1 | Half duplex access |
| | | FULL | May | 2 | Initial full-duplex access |
| read | MIN | — | Min | 3 | Half duplex or initial full-duplex access |
| read or write | MID | FULL | Mid | 4 | MID-level duplex access |
| | MAX | FULL | Max | 5 | MAX-level duplex access |
| | MID,MAX | HALF | Bad | 6 | Inconsistent precedence/duplex levels |

| Internal Request Label | sBuf state | Row | Action |
|---|---|---|---|
| not Bad | posted write or active read/write | 1 | Incoming requests not serviced |
| not Bad | passive read/write | 2 | Convert to CONFLICT-status response, to resolve opposing conflict |
| Bad | any state | 3 | Conflict to CONFLICT-status response, to report inconsistent precedence |
| May,Min,Mid,Max | empty | 4 | Request transferred into sBuf, marked active |

FIG. 17

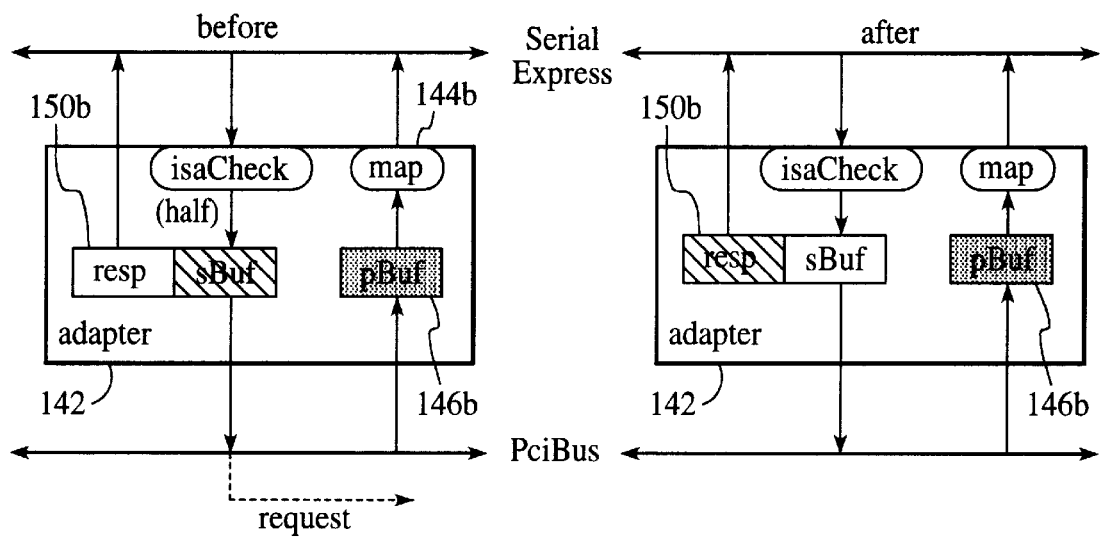

FIG. 18A  FIG. 18B

| sBuf request | pBuf state | idCheck | Row | Action |
|---|---|---|---|---|
| active/passive write {Mid,Max} | read | — | 1 | Change sBuf mode to passive (other incoming requests are rejected). |
| active/passive readMax | " | — | 2 | |
| active/passive readMid | " | KEEP | 3 | |
| active write {May,Mid,Max} passive write {Mid,Max} | not read | — | 4 | The sBuf write is posted: 1) Generate response and 2) Mark sBuf-queued write as posted. |
| posted write | not read | — | 5 | Initiate PciBus transaction; if not busied complete by discarding sBuf -posted request. |
| | read | — | 6 | Should never occur-fatal error condition. |
| active read {Min,Mid,Max} passive read {Mid,Max} | posted | — | 7 | Convert to CONFLICT-status response to avoid opposing resource deadlock. |
| active writeMin | " | — | 8 | |
| active readMin or active write {May,Min} | read | — | 9 | |
| active/passive readMid | " | TOSS | 10 | |
| active writeMin/readMin active read {Mid,Max} passive read {Mid,Max} | empty | — | 11 | Initiate PciBus transaction; if not busied, convert to PASS/FAIL-status response. | idCheck= ((sBuf.sourceId>nodeId)&&(pBuf.targetId>nodeId)) ? KEEP:TOSS;

FIG. 19

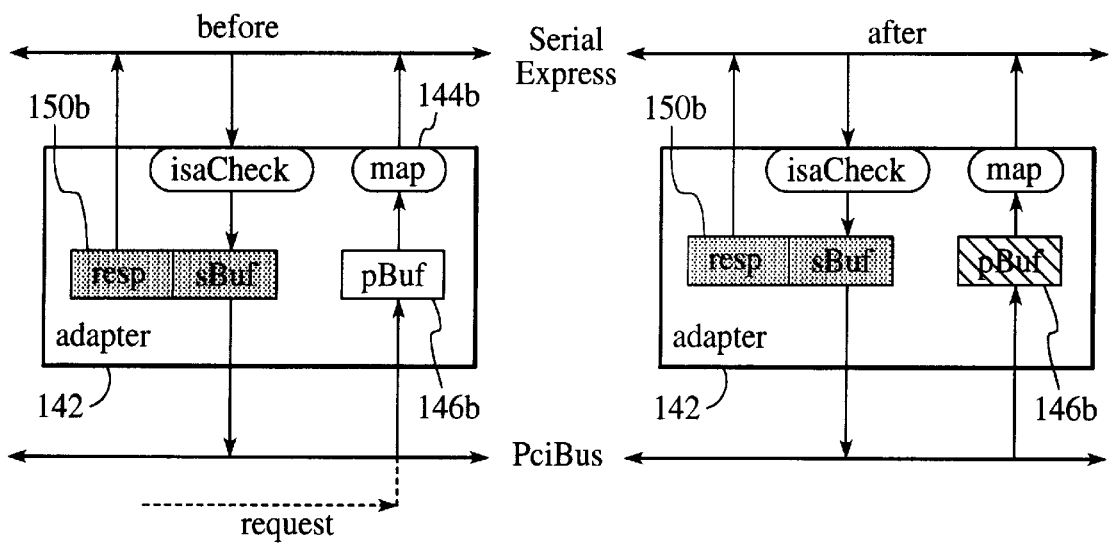

FIG. 20A   FIG. 20B

| PciBus request | pBuf state | sBuf state | idCheck | Row | Action |
|---|---|---|---|---|---|
| read | empty | empty | — | 1 | Incoming request activates *pBuf* processing; send a SerialExpress request and extend the PciBus transaction until a SerialExpress response returns. |
| | | readMin, writeMin | — | 2 | |
| | | readMid | TOSS | 3 | |
| write | empty | — | — | 4 | Write request marked posted and placed in *pBuf*; PciBus transaction is completed normally |
| — | posted | read{Min,Mid,Max} | — | 5 | Not serviced until *sBuf* read has been rejected. |
| — | | not read{Min,Mid,Max} | — | 6 | Send a SerialExpress request and wait until the SerialExpress response returns. | idCheck= ((sBuf.sourceId>nodeId)&&(pBuf.targetId>nodeId)) ? KEEP:TOSS;

FIG. 21

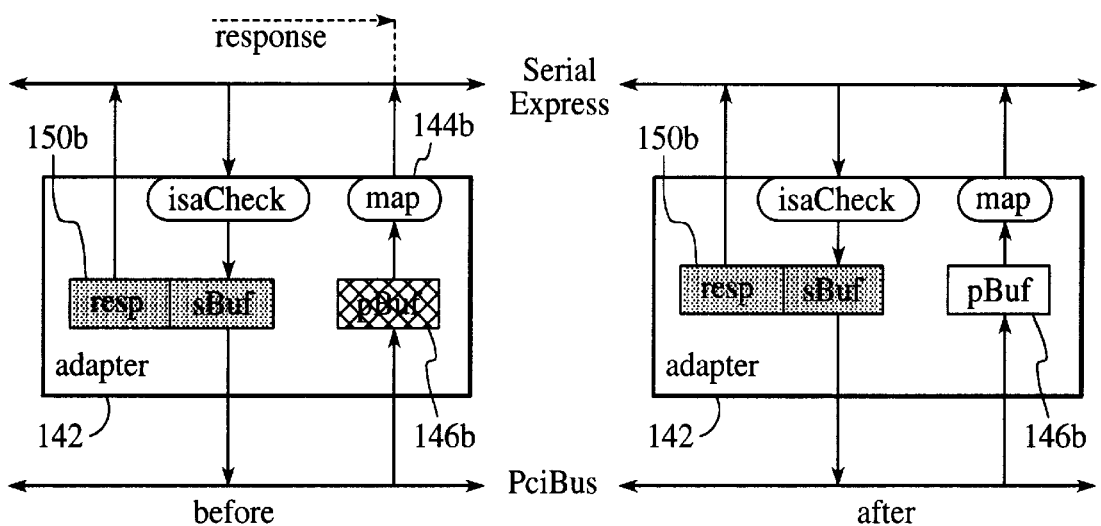

FIG. 22A   FIG. 22B

| pBuf state | SerialExpress response | sBuf state | idCheck | Row | Action |
|---|---|---|---|---|---|
| posted | CONFLICT-FULL | — | — | 1 | Write request is resent. |
| | COMPLETE | — | — | 2 | Posted-write completes. *pBuf* is emptied. |
| | CONFLICT-HALF | — | — | 3 | Posted-write is discarded, error is logged. |
| read | CONFLICT-FULL | empty | — | 4 | Read request is resent. |
| | | readMin, writeMin | — | 5 | |
| | | readMid | TOSS | 6 | |
| | | writeMid, writeMax | — | 7 | PciBus read is busied, *pBuf* is emptied. |
| | | readMax | — | 8 | |
| | | readMid | KEEP | 9 | |
| | COMPLETE | — | — | 10 | Complete PciBus request, mark *pBuf* empty. |
| | CONFLICT-HALF | — | — | 11 | Terminate PciBus request, mark *pBuf* empty. |
| | — | posted | — | 12 | Never happens-fatal error condition. |

FIG. 23

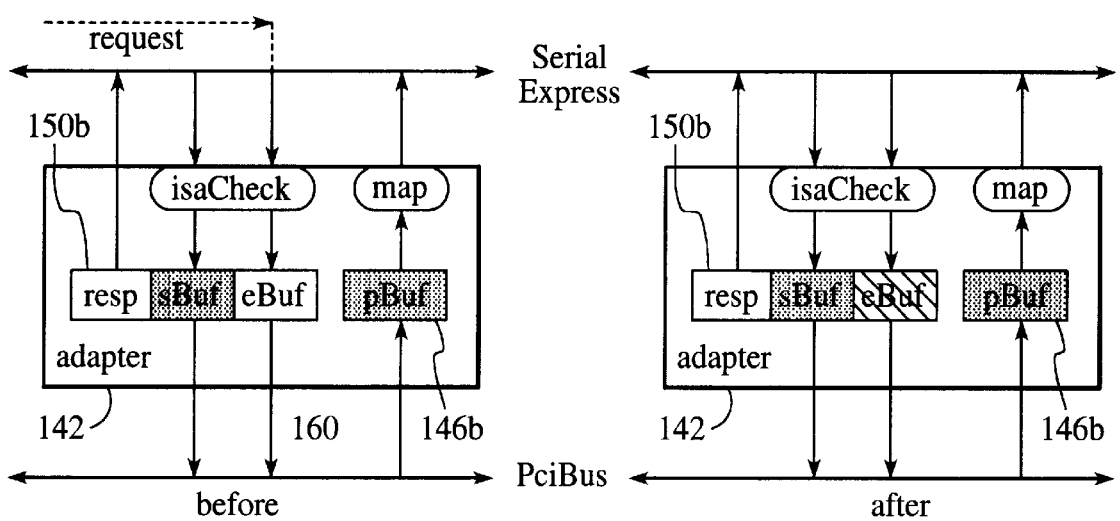

FIG. 24A      FIG. 24B

| eBuf state | sBuf state | pBuf state | Row | Action |
| --- | --- | --- | --- | --- |
| passive read/write | posted | — | 1 | Not serviced (waits for unposted sBuf) |
| passive read/write | not posted | — | 2 | Mode changed from passive-to-active. |
| active read | — | posted | 3 | Initiate PciBus transaction. If not busied, convert to passive PASS/FAIL-status response. |
| " | — | not posted | 4 | Initiate PciBus transaction. If not busied, convert to active PASS/FAIL-status response. |
| write | — | — | 5 | |
| passive reponse | — | not posted | 6 | Change eBuf -response state from passive-to-active |
| active response | — | — | 7 | Return eBuf response to the requester. |

FIG. 26

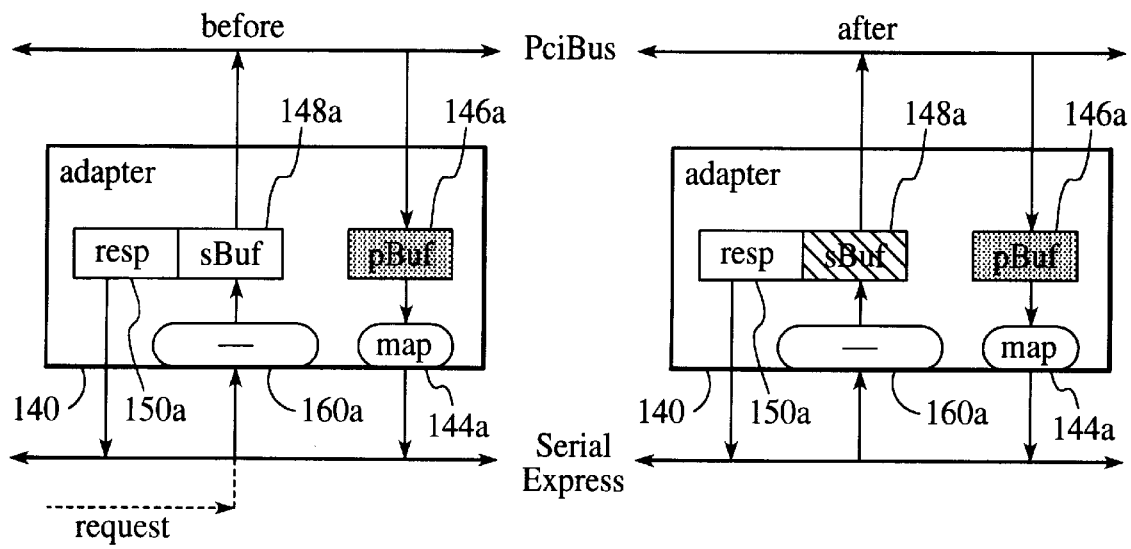

FIG. 27A  FIG. 27B

| request precedence | sBuf state | Row | Action |
|---|---|---|---|
| MID | posted write or active read/write | 1 | Incoming requests not serviced |
| | empty | 2 | Request transferred into *sBuf* |
| | passive read/write | 3 | Generate CONFLICT-status response |
| not MID | — | 4 | Generate FAULT-status response |

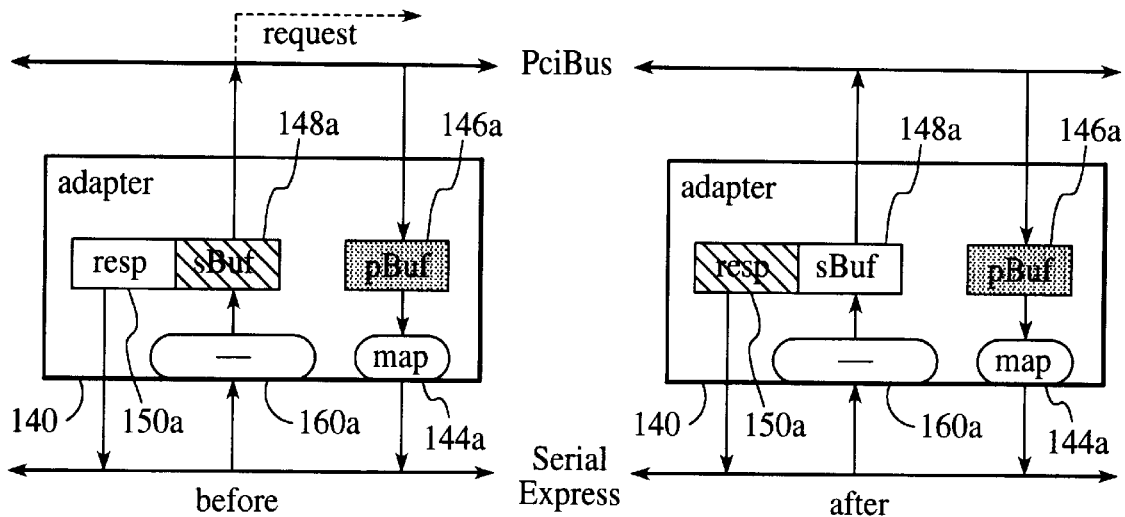

FIG. 30A    FIG. 30B

| sBuf | pBuf | Row | Action |
|---|---|---|---|
| active/passive write | read{Min,Max} | 1 | Set label to passive (other incoming requests are rejected) |
| active/passive read | readMin or writeMin | 2 | |
| active/passive write | not read{Min,Max} | 3 | Post the *sBuf* write: 1) Generate response and 2) Mark *sBuf*-queued write as posted. |
| posted write | posted or empty | 4 | Initiate PciBus transaction. If not busied, complete by discarding *sBuf*-posted request. |
| | read{Min,Max} | 5 | Should never occur-fatal error condition. |
| active/passive read | posted | 6 | Convert to CONFLICT-status response (provides FULL indication). |
| | readMax | 7 | |
| | empty | 8 | Initiate PciBus transaction. If not busied, convert to PASS/FAIL-status response. |

FIG. 31

| PciBus request | sBuf state | Row | Action |
|---|---|---|---|
| read | not posted | 1 | Incoming request activates *pBuf* processing; |
| write | — | 2 | send the request subaction and wait for response. |

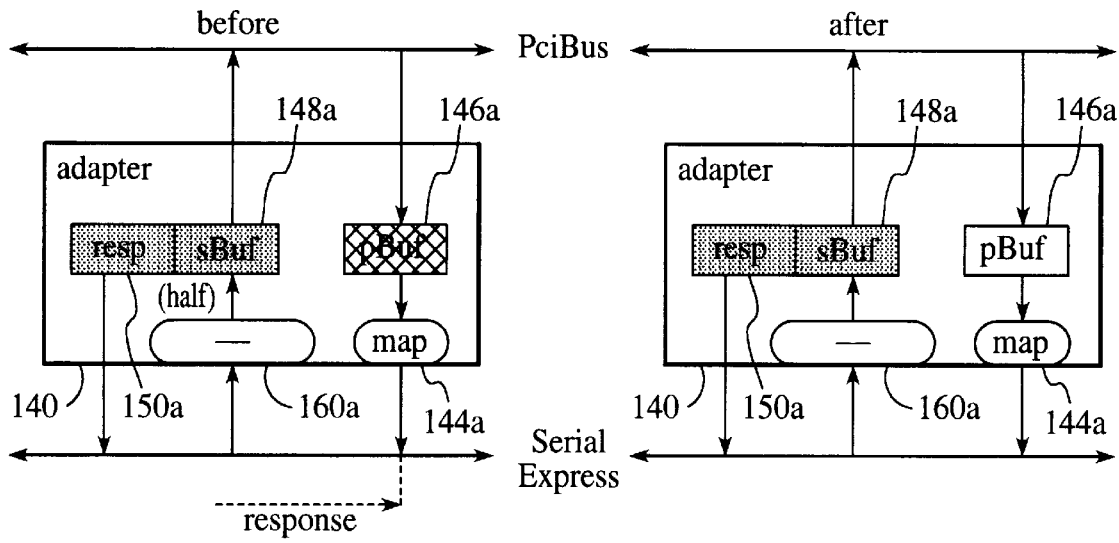

FIG. 34A    FIG. 34B

| pBuf | SerialExpress response | sBuf | Row | Action |
|---|---|---|---|---|
| write{Min,Max} | CONFLICT-FULL | — | 1 | Complete PciBus write, mark *pBuf* posted. |
| writeMin | CONFLICT-HALF | empty | 2 | Resend, as writeMin. |
| posted | CONFLICT-FULL | — | 3 | Resend, as writeMax. |
|  | COMPLETE | — | 4 | Posted-write completes. *pBuf* is emptied. |
|  | CONFLICT-HALF | — | 5 | Posted-write terminates, error is logged. |
| read{Min,Max} | CONFLICT-FULL | empty or read | 6 | Resend, as readMax. |
| readMin | CONFLICT-HALF | empty | 7 | Resend, as readMin. |
| read{Min,Max} | CONFLICT-FULL | write | 8 | PciBus request is busied, |
| readMin,writeMin | CONFLICT-HALF | read or write | 9 | *pBuf* is marked empty. |
| writeMin, writeMax, readMin, readMax | COMPLETE | — | 10 | Complete PciBus request, successful acknowledge code returned. |
| readMax,writeMax | CONFLICT-HALF | — | 11 | Terminate PciBus request, error acknowledge code provided. |
| read{Min,Max} | — | posted | 12 | Never happens-fatal error condition. |

FIG. 35

METHOD AND SYSTEM FOR AVOIDING STARVATION AND DEADLOCKS IN A SPLIT-RESPONSE INTERCONNECT OF A COMPUTER SYSTEM

The present application is a Continuation of U.S. Ser. No. 08/705,324, filed Aug. 29, 1996, now U.S. Pat. No. 5,961,623.

FIELD OF THE INVENTION

The present invention relates generally to data transfers in multiprocessor computer systems, and more particularly to a method and system for avoiding starvation and deadlocks within a split-response interconnect of a computer system.

BACKGROUND OF THE INVENTION

The use of split-response buses and bus-like interconnects is a recent trend in computer design. In some computer architectures, several processors may be coupled to the same split-response bus. In multi-processor architectures, however, several local buses are often employed with a plurality of processors attached to each local bus. The local buses are in turn connected together by bridges that transfer data from one bus to the other and vice versa. The bridges vary significantly in complexity, and can provide for the complete reformatting of data passing through the bridge or do little more than temporarily buffer the data. Moreover, it is common for the processors to share memories which may be attached to any one or several of the buses in such a multi-processor environment.

Because of the configuration just described, data transfers between nodes of the system, i.e., from memory to the processors, from processor to processor, or from bridge to processor, are a common event. A majority of the bus bandwidth is utilized servicing transfer requests via read and write transactions. In multiprocessor environments, reads and writes are used to transfer data between memory and caches, or between processor caches. Input and output (I/O) devices also use reads and writes to access memory. An I/O device can also use a write transaction to interrupt the processor when an I/O operation completes.

Any device connected to the bus that can transmit and receive read and write transactions is referred to as a node. In split-response bus multiprocessor systems, read and write transactions sent over the bus between nodes are split into request and response subactions. Request and response subactions transmitted between local systems must pass through a bridge.

The bridge has the behavior of an intermediate agent as these subactions are transferred from a requesting node to a responding node. On the first bus, the bridge consumes packets generated by the requesting node, queuing them for retransmission on the second bus. On the second bus, the bridge is the requester, generating subaction packets for consumption by the responder node.

Each local bus in the multiprocessor computer system may be connected to the split-response bus using an adapter. Adapters for local buses, such as for a peripheral component interconnect (PCI) bus, are similar in operation to bridges, but have other special requirements. An example of such special requirements is that the PCI specification normally assumes that PCI adapters will process write requests as posted writes.

A posted write is a request that is performed by pretending that the write has completed when the write request has been queued in the adapter. More specifically, when a posted write request is received by the adapter, the adapter queues the request and attempts to forward the request to the responding node on the local bus. Even if the request cannot be immediately forwarded, the adapter generates a response subaction having a completed status and transmits the response back to the requesting node. The completed status indicates that the write has completed, even though in many cases it has not.

For posted writes, the adapter enforces ordering constraints on incoming request to guarantee that other nodes cannot determine that the write has not yet completed. By properly delaying the progress of (potentially) dependent request and response subactions within its queue, the adapter allows the posted write to complete before the queued-but-incomplete nature of the posted-write can be observed by other nodes. For example, assume that after transmitting a posted write and receiving a response in return, the requesting node initiates a read to determine if the write has taken effect. The adapter would queue the new read request, but enforce ordering of the queued requests so that by the time the read request is serviced, the write request has completed. This is an example of the posted-write/request ordering constraint; a following read or write request is not allowed to bypass a previously-posted write transaction.

As another example, assume a DMA-capable I/O device is on busB, a processor and memory are on busA, and that busA and busB are connected by a bridge. To transfer data into the memory on busA, the I/O device issues a posted write request from busB-to-busA, and a done bit is set on busB when the write completes. To read the I/O device's done bit, the processor on busA initiates a busA-to-busB read request. Delaying the response for the read request until the busB-to-busA posted write completes is an example of a posted-write/read response ordering constraint.

Thus, with a posted write, there is no way of determining through normal bus connection paths whether the posted write request has actually been performed.

Handling posted write requests is one instance when adapters delay the progress of transactions. Adapters, as well as bridges, must also delay the progress of subactions when their queues become filled with pending subactions. There are generally two ways of delaying the progress of other subactions; a busy/retry protocol, and a reject/resend protocol. The busy/retry protocol is typically employed by both bridges and adapters, while the reject/resend protocol is only used by adapters.

The busy/retry protocol is normally used by a consumer node (including adapters and bridges) to delay the acceptance of new request and response subactions once the consumer node's queues have been temporarily filled. When a bridge forwards a subaction packet from a producer to a responder node, the bridge becomes the producer and the responder becomes the consumer. If the consumer node's queues have been temporarily filled, the consumer node returns a busy indication (also called an acknowledge or ack) to the producer, which in this case is the bridge. After observing the busy indication, the producer retries by retransmitting the subaction packet (repeatadely if necessary). The producer stops retrying when a done indication (as opposed to busy) is returned by the responder.

Adapters sometimes use the reject/resend protocol to delay processing of request subactions when maintaining the illusion of posted-write completions. In this case, a request subaction is temporarily accepted into a request queue of an adapter. To make space for additional requests, the adapter has the behavior of a surrogate responder: the request is converted into a response that is returned to the requester. The response contains a CONFLICT indication, that causes the requester to resend the request subaction, in the hope that the rejection condition will eventually be resolved.

Using the busy/retry protocol when transmitting data between bridges is more efficient than the reject/resent protocols because the subactions can remain in bridge queues while being retried. The reject/resend protocol is less efficient because a new request has to be resent from the original requester in reaction to a rejection, even though the request may have passed through multiple bridges before the conflict condition was detected.

Standard busy/retry techniques exist to ensure forward progress, in that the oldest of the retried subactions is eventually accepted. In some environments, however, the busy/retry protocols can deadlock because the adapter/bridge queues are interdependent. For example, assume the queues in nodes A,B,C are full. Assume further that node A sends a subaction from its queue towards node B, node B sends a subaction from its queue towards node C, and node C, in turn, sends a subaction from its queue towards node A. Note that the nodes cannot receive incoming subactions until a space is freed in their respective queues. Normally, a space is made when a subaction is sent from the node's queue and received by another node. In the example above, however, a space cannot be made in the node queues because the transactions sent from each queue can never be received by the intended node. This condition is known as a queue dependency.

Similar queue dependencies can cause deadlocks between the posted-write queues of PCI adapters and the request/response queues of split-response buses, unless some of the dependent subactions in the adapter queues are rejected. For that reason, the reject/resend protocols (rather than the busy/retry protocols) are used to delay the completion of (potentially) dependent subactions when posted writes have been queued in PCI adapters.

Although the reject/resend techniques are supported in several standards, there are no equivalent assurances of forward progress defined for the reject/resend protocols as there are for the busy/retry protocol. Starvation could occur if a subactions sent by a particular node were continually rejected by a responding node in favor of other nodes. And resolving queue conflicts by rejecting all incoming subactions would result in livelock; a situation where the queues are immediately refilled with resent requests. Both starvation and livelock prevent forward progress of subactions over the buses in a multiprocessor computer system.

Accordingly, what is needed is a method and system for avoiding starvation and deadlocks in a split-response computer system containing bridges and adapters. The present invention addresses such needs.

SUMMARY OF THE INVENTION

The present invention provides a method and system for avoiding starvation and deadlocks in a split-response-bus multiprocessor computer system. The multiprocessor computer system includes a first node and a second node coupled to the split-response bus, wherein the first and second nodes communicate by passing request packets over the split-response. The method and system includes providing precedence information in the request packets, and then using the precedence information when receiving the request packets to determine which request packets to process and which request packets to reject when a conflict occurs.

According to the system and method disclosed herein, the present invention ensures forward progress on the bus by ensuring that some subactions are rejected (to avoid deadlock) but that some are allowed to complete (to avoid starvation), thereby ensuring forward progress on the split-response-bus.

BRIEF DESCRIPTION OF THE DRAWINGS

FIG. 17 is a table describing the rules the lower-level PCI adapter follows when processing the incoming-request queue subactions.

FIGS. 18a and 18b are block diagrams showing the servicing of SerialExpress request by a lower-level PCI adapter.

FIG. 19 is a table describing the rules the lower-level PCI adapter follows when servicing SerialExpress requests.

FIGS. 20a and 20b show the process of accepting incoming PCI bus requests by a lower-level PCI adapter.

FIG. 21 is a table describing the rules the lower-level PCI adapter follows when processing PCI bus requests.

FIGS. 22a and 22b are block diagrams depicting PCI bus transaction completion by the lower-level PCI adapter.

FIG. 23 is a table describing the rules followed by the lower-level PCI adapter when processing SerialExpress responses and their affiliated pBuf-queued requests.

FIGS. 24a and 24b are block diagrams showing a lower-level adapter queuing split-request received from the SerialExpress bus.

FIG. 26 is a table describing the rules the lower-level PCI adapter follows when processing eBuf-queued SPLIT-labeled requests.

FIGS. 27a and 27b are block diagrams showing the components of a higher-level PCI adapter when accepting a SerialExpress request.

FIGS. 30a and 30b are block diagrams depicting higher-level SerialExpress request servicing.

FIG. 31 is a table describing the rules the higher-level PCI adapter follows when processing sBuf-queued requests.

FIGS. 34a and 34b are block diagrams illustrating the processing of response requests received by the high-level PCI-adapter from the SerialExpress.

FIG. 35 is a table describing the rules the higher-level PCI adapter follows when processing SerialExpress responses and their affiliated pBuf-queued requests.

DESCRIPTION OF THE INVENTION

The present invention relates to an improvement in data transfers in a multiprocessor system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
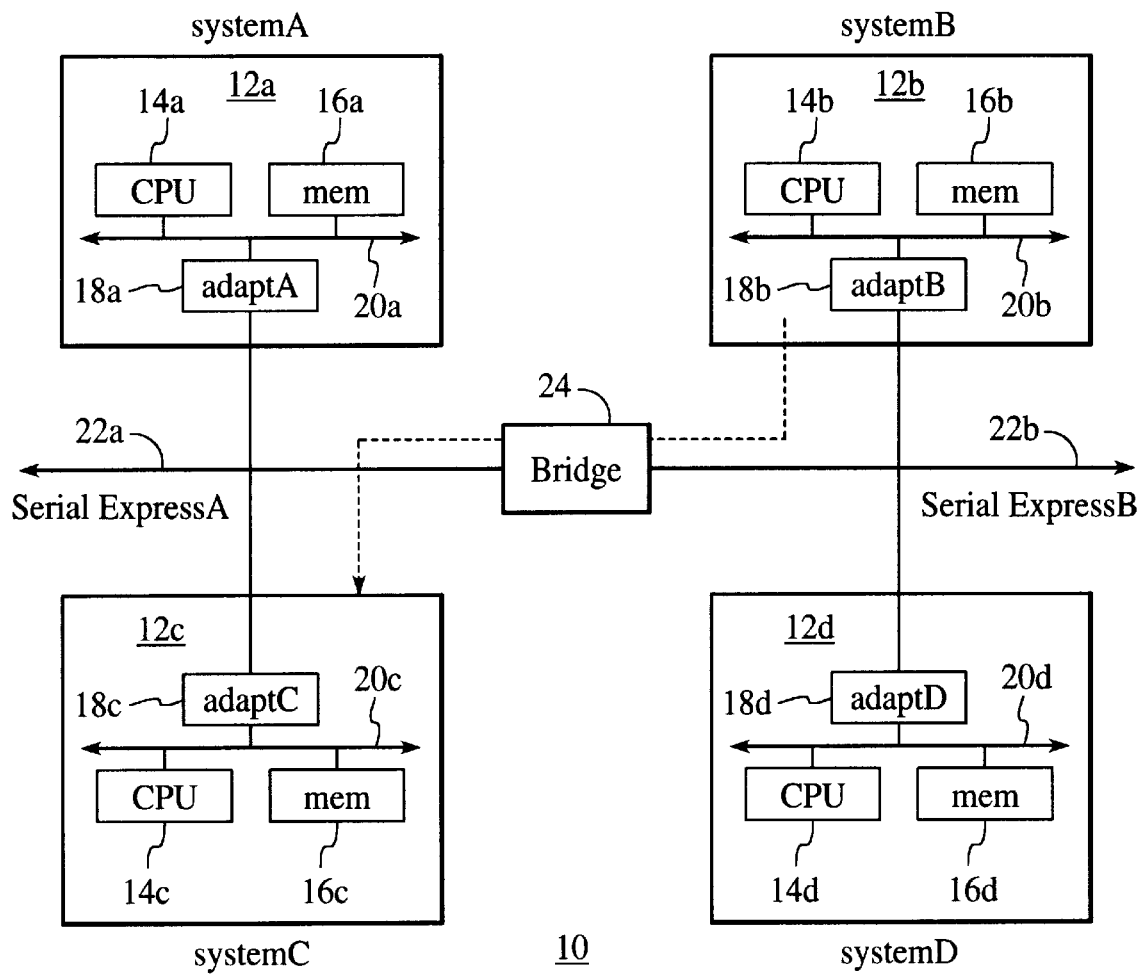
FIG. 1 is a block diagram of a computer system having a multiprocessor topology.

Referring now to FIG. 1, a block diagram of a computer system 10 having a multiprocessor topology is shown. The multiprocessor computer system 10 includes four computer systems 12a–12d, shown as systemA, systemB, systemC, and systemD, respectively. The computer systems 12a–12d (hereinafter collectively referred to as computer systems 12) each include a respective central processing unit (CPU) 14a–14d, a memory 16a–16d, and a host adapter 18a–18d, each of which is coupled to a host bus 20a–20d.

The multiprocessor computer system 10 further includes two serial split-response buses 22a and 22b, called SerialExpressA and SerialExpressB, respectively. As shown, computer systems 12a and 12c are coupled to SerialExpress bus 22a, and computer systems 12b and 12d are coupled to SerialExpress bus 22b. SerialExpress buses 22a and 22b are in turn, coupled together via a bridge 24. Any component in the computer system 10 that is addressable from the SerialExpress buses 22a and 22b is referred to as a node.

Although the multiprocessing system 10 will be described in terms of having four computer systems 12 and four processors 14, those skilled in the art will realize the multiprocessor system 10 is applicable to systems that include any number of computer systems 12 and any number of processors 14.

Each of the memories 16 comprise random access memory (RAM) for storing data and program instructions for their respective processor 14. Each of the processors 14 access data in the corresponding memory 16 via the host bus 20. In an exemplary embodiment, the processors 14 are PowerPC processors from Motorola Corporation of Schaumberg, Ill. The processors 14 may alternately be Alpha Processors from the Digital Equipment Corporation of Maynard, Mass., or any other microprocessors capable of being used in a multi-processor computer system. In addition, some or all of the processors 14 may include an integrated cache (not shown). Each of the processors 14 may access data in memories 16 located in other computer systems 12 by issuing transactions over the SerialExpress buses 22a and 22b.

The term "SerialExpress" is the current name assigned to the next iteration of a serial bus (IEEE std 1394–1395) and scalable coherent interface standard (IEEE std 1596–1992) defined by IEEE Working Group P1394.2. The SerialExpress buses 22 are a physical collection of point-to-point links that provide bus-like services for the multiprocessor system 10 by transferring transactions between the computer systems 12 over point-to-point interconnects (rather than slower bused wires).

The SerialExpress bus standard supports several types of transactions, which are initiated by a requesting node, referred to as the requestor, and completed by a responding node, referred to as the responder.

Two types of transactions that are relevant to this discussion are read and write transactions. A read transaction returns data from the responder to the requestor. A write transaction transfers data from the requester to the responder.

Transactions are typically sent between a processor (the requestor) and memory (the responder). Transactions may also be transported through adapters and bridges, to access nodes located on remote buses, as illustrated in FIG. 1. In this illustration, the dotted line illustrates the path of a transaction initiated by a CPU 14B in system B; this transaction passes through adapter 18B, the bridge 24, and adapter 18C, before being completed on system C.

The host buses 20 in each of the computer systems 12 may implement a different protocol than the SerialExpress buses 22, or implement the same protocol in a different manner. Therefore, the host adapters 18 are used to adapt the different capabilities between the host buses 20 and the SerialExpress buses 22. For example, assume that the processor in systemA implements cache coherency, but that other processors in the computer system 10 do not. The host adapter 18a would then ensure that incoming transactions to systemA behave like cache coherent transactions on the host bus 20a, but would not require coherency to be extended on outgoing transactions on the SerialExpress bus 22a.

The bridge 24 between the two SerialExpress buses 22 is not used to modify transactions, but rather is used to isolate the two SerialExpress buses 22. Buses in large multiprocessor topologies are often isolated to increases overall performance of the computer system 10 by allowing local transactions (those that do not pass through a bridge) to be concurrently active on both buses. Such buses can also be used to increase the fault tolerance of the computer system 10, since they can be turned off to isolate one-half of the system from the other.

As stated above, the SerialExpress standard supports read and write transactions between nodes in the system. To support bidirectional transfers, both the read and write transactions are split into request subactions and response subactions. Transactions that are split in this manner are called split-response transactions.

A request subaction transfers an address and command (and data in the case of a write) from the requestor to the responder. A response subaction returns a completion-status (and data in the case of a read) from the responder to the requestor indicating whether the request has completed or not. Both the request and the response subactions are transferred through the computer system 10 using subaction packets.

Figure 2:
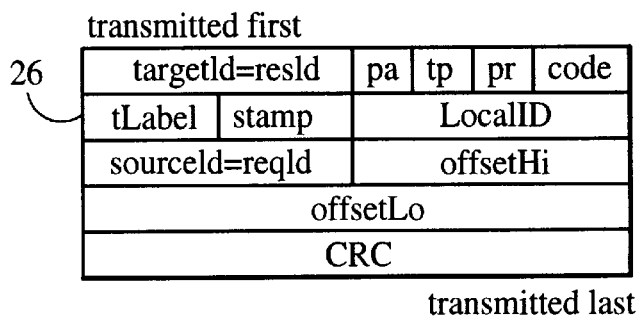
FIG. 2 is a block diagram depicting the contents of a conventional data packet used to transmit request subactions and response subactions over a split-response bus.

FIG. 2 is a block diagram depicting the contents of a conventional data packet 26 used to transmit request subactions and response subactions, as defined by the SerialExpress standard. The packet 26 includes the following fields:

a targetId field that identifies a requester/responder Id (i.e., the destination node);

a packet age (pa) field;

a type (tp) field that specifies types of send and acknowledge packets;

a priority (pr) filed that specifies a packet priority;

a command code (code) field that specifies different send-packet formats (write-request, read-request, response, etc.);

a transaction label (tlabel) field that is included in returned response packets for matching requests from the same requestor with the corresponding responses;

a stamp field that indicates the time at which the packet is considered stale and should be discarded, called the Time of Death. From the Time of Death the life time, or Time of Life, may also be determined for the current packet;

a localId field that includes information regarding the local node that produced the packet;

a sourceId field that identifies a requestor in a request subaction, or a responder in a response subaction;

address offsetHi and offsetMIN fields (within request packets) that are concatenated to specify a 48-bit offset location being accessed (within responses, these fields provide completion-status information); and a cyclical redundancy check (CRC) field used for error checking. In addition, N data bytes (not shown) are also sometimes included in the packet 26 for read-response and write-request subactions.

Figure 3:
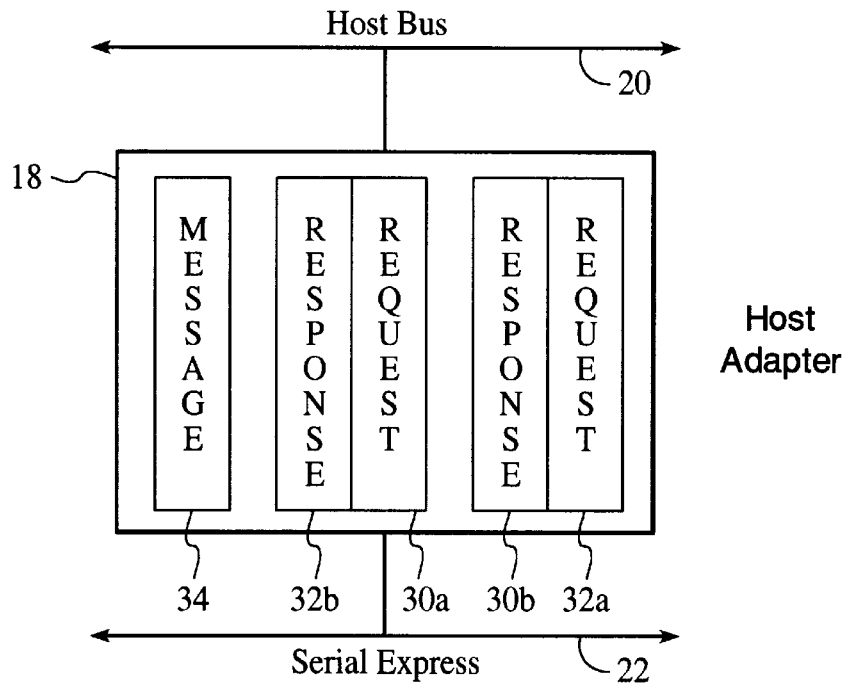
FIG. 3 is a block diagram illustrating components of a host adapter.

Referring now to FIG. 3, a block diagram illustrating components of a host adapter 18 that is used in the local computer systems 12 is shown. The adapter 18 includes a message queue 34 and two pair of request/response subaction queues 30 and 32, one for host bus 20 and one for SerialExpress bus 22 to which the adapter 18 is connected.

The request subaction queue 30a is for storing incoming read/write request subactions from the SerialExpress bus 22, and response queue 30b is for transmitting response subactions over the SerialExpress bus 22. The request subaction queue 32a is for storing incoming request subactions from the host bus 20, and response message queue 32b is for transmitting response subactions over the host bus 20.

Read and write transactions implemented using packet 26 (FIG. 2) between a requesting node and a responding node usually occur after some form of negotiation between the requester and responder (e.g., to decide on a correct address to access). Sometimes, however, such prenegotiation isn't possible because the shared memory locations have not been previously allocated for unexpected communication. Other times, such communication through shared memory locations isn't desirable, since security requirements may require that the CPU process and verify all communications.

Thus, there are some environments which use messages to communicate between processors, rather than updating shared memory locations. The message queue 34 is used for storing incoming messages, while the standard subaction queues 30b and 32b) are used for transmitting outgoing messages. Messages transmitted over the multiprocessor system 10 are typically implemented using split-response write transactions. In this case, a message is transferred by having the requester send a write request to the responder, where the offset address specified in the write request corresponds to the address of the responder's message queue 34. These writes typically transfer 16 or 64 bytes of data.

The message-passing write request is typically a posted write request. When this posted write request is received by the host adapter 18 via the SerialExpress bus 22, the request is determined to be a message and is queued in the message queue 34 for forwarding by the processor on the host bus 20. Even if the request cannot be forwarded immediately, the host adapter 18 generates a response subaction and transmits the response back to the requesting node with a completed status. The completed status indicates that the write has completed, even though in most cases it has not.

The bridge 24 is similar to the host adapter 18 in that it also includes two pair of request/response queues 30 and 32 (one for each SerialExpress bus), but the bridge 24 does not include a message queue 34. In both the bridge 24 and host adapter 18, however, a problem may arise when the request/response queues 30 and 32 become filled with subactions.

Two protocols may be used to delay the acceptance of new subactions when no request/response queue space is available; a busy/retry protocol and a reject/resend protocol. The busy/retry protocol is to delay the acceptance of new subactions once the request or response queues 30 and 32 have been temporarily filled in the host adapter 18. When another subaction is received, the host adapter 18 returns a busy indication (also called an acknowledge or ack). When the requester observes the busy indication, the subaction is retried (e.g. retransmitted). The retries stop when a done indication (as opposed to busy) is returned.

In FIG. 1 for example, a request subaction may be successfully transferred from systemB to the bridge 24. If adapterC's request/response queues are filled, the bridge 24 to adapterC transfer will be busied. After being busied by adapterC (the consumer), the request remains queued in the bridge 24 (the producer) while being retried.

The reject/resend protocol is also used to delay subactions. In this case, a new request subaction is temporarily accepted into the message queue 34 of the adapter 18. To allow other requests to be accepted (rather than busied), the adapter 18 converts the request into a response, and that response is returned to the requester. The response contains a CONFLICT indication that causes the request to be resent by the requester. When the request is resent and the rejection condition has been resolved, a response with the normal COMPLETE indication is returned.

Referring again to FIG. 1, the reject/resend protocols are invoked as follows. When a request subaction is transferred from systemB to the bridge 24, and then from bridge 24 to adapterC. After the request has been accepted by adapterC (the responder), the a CONFLICT-status response is generated by adapter C. This response is transferred from adapterC to the bridge 24, and then form the bridge 24 to systemB. After receiving the CONFLICT-status response, the systemB CPU 14b (the requester) accepts the responsibility of resending the original request.

The busy/retry protocol is used when transmitting subactions between the normal request and response subaction queues of bridges 24. In this environment, the busy/retry protocol is more efficient than the reject/resend protocols, because the request subaction can remain in an intermediate bridge 24 while being retried. With the reject/resend protocol, the request has to be resent from the original requester, even though the request may have passed through multiple bridges before the conflict condition was detected.

The reject/resend protocol, rather then the busy/retry protocol, is used to delay the acceptance of the posted writes placed in the message queues 34. Using the busy/retry protocol for the message-queue application, the busy/retry protocol could cause deadlocks, as explained below.

Figure 4:
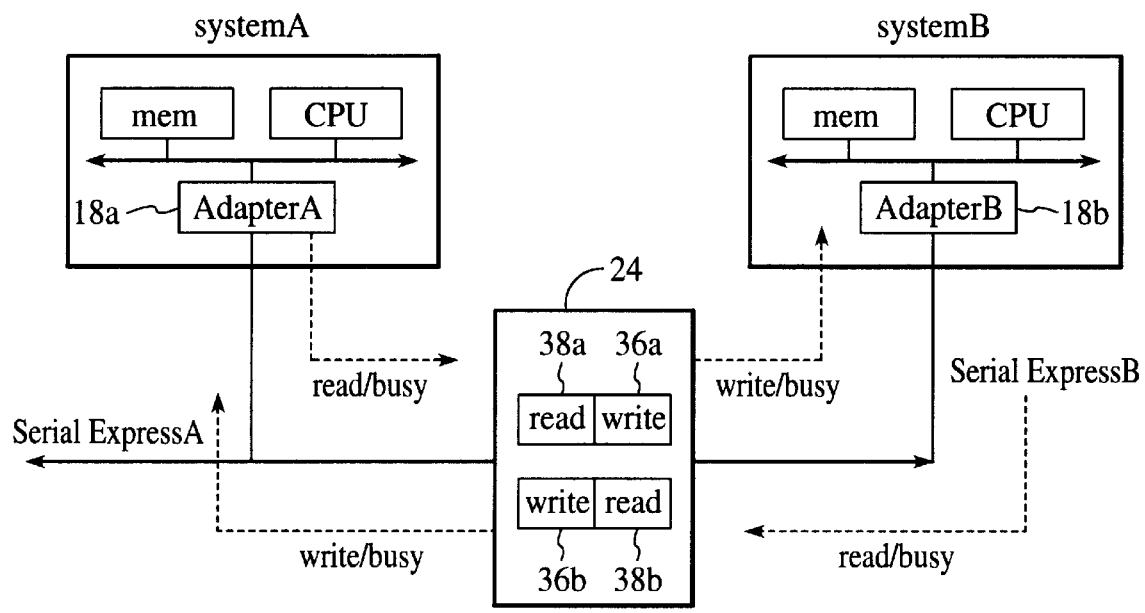
FIG. 4 is a block diagram illustrating the result of using busy/retry protocols to delay acceptance of message-queue write requests in a split-response multiprocessor system.

FIG. 4 is a block diagram illustrating the result of using busy/retry protocols to delay acceptance of message-queue write requests in a split-response multiprocessor system. Assume that the message-passing queues 34 (FIG. 2) in both adapterA and adapterB are full, and that other write request 36 intended for the message queues 34 have been queued in the bridge 24 by other (non-illustrated) nodes. Assume that in order to service its messages, systemA requires access to SerialExpressB resources. And that similarly, in order to service its messages, systemB requires access to SerialExpressA resources.

As shown, message servicing in this manner generates read subactions 38, and these read subactions 38 become blocked in the bridge 24, behind the writes 36 intended for the message queues 34 in the adapters. The write requests 36 from the bridge 24 can't complete because the message queues 34 in adapterA and adapterB are full. And the messages queued in adapterA and adapterB can't be processed because their servicing is delayed until reads 38a and 38b are allowed to complete. Using the busy/retry protocol in this condition would result in busy conditions sent in all directions, as shown, so the system deadlocks.

Even if the deadlocks caused by the busy/retry protocols could be resolved, the busy/retry protocols would delay the processing of write requests in the bridge 24 until some of the message-queue writes could be processed by software. The transaction latency (the time between the generation of the request and the receipt of the response) would then become dependent on the execution time of message processing software. Such dependencies would make it difficult to bound the timeout interval for a split-response transaction, making it difficult to safely detect transaction-completion failures.

The reject/resend protocols is typically used to avoid the problems encountered when using the busy/retry protocols. The reject/resend protocols is used to flow control the acceptance of write requests at the host adapter's 18 message queue 34. The reject/resend protocols effectively flush the bridge's write-subaction queues, whereupon the reads generated by the message-service software in the host adapters 18 can complete.

Recognizing the need to avoid deadlocks and to provide bound split-response timeouts, the reject/resend protocol has been defined by the CSR Architecture (ISO/IEC 13213: 1994 ANSI/IEEE Std 1212, 1994 Edition●CSR Architecture ) and incorporated on Serial Bus (IEEE Std 1394, 1995) and SCI (IEEE Std 1596, 1992).

Although this basic reject/resend scheme avoids deadlocks, the above standards have failed to recognize that the reject/resend scheme fails to ensure that one message sender won't be starved for service because it always encounters a full message queue with messages from other processors.

Starvation

Figure 5:
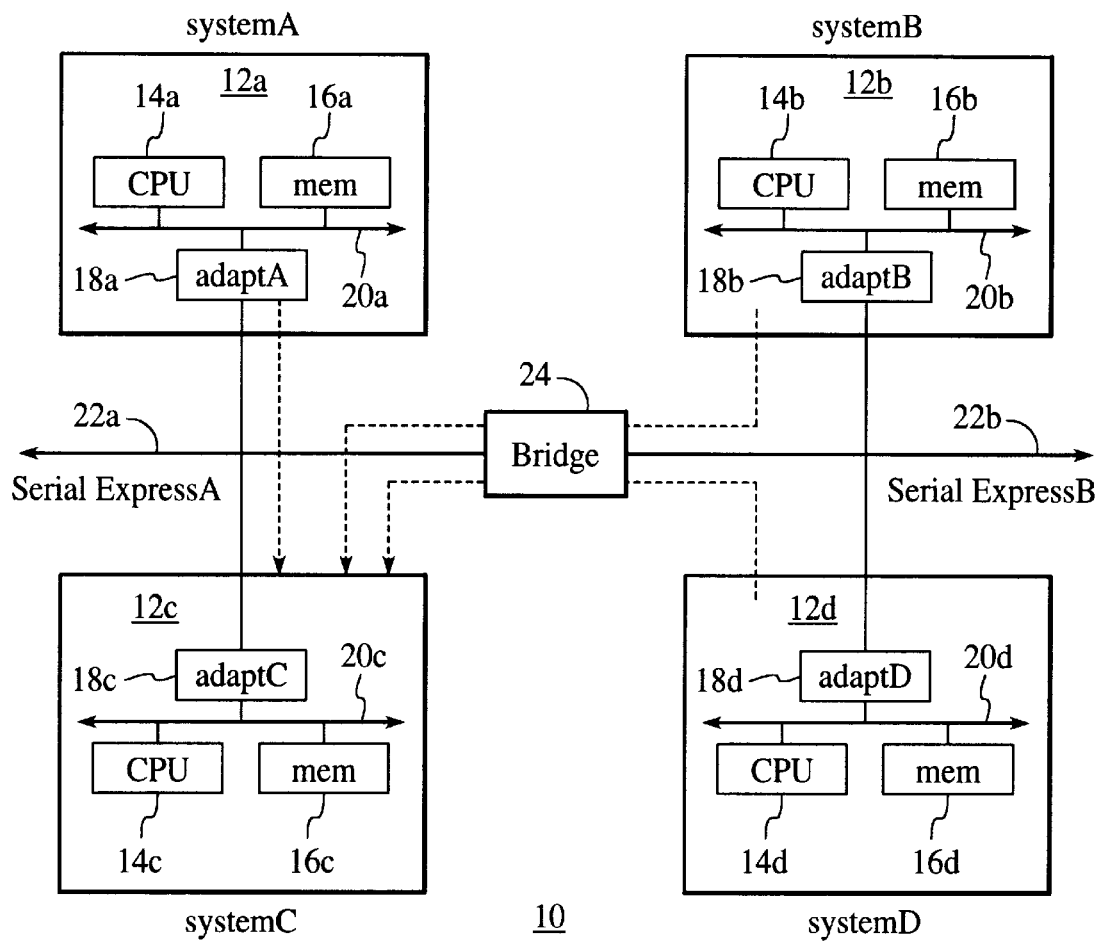
FIG. 5 is a block diagram of the multiprocessor computer system of FIG. 1 in which multiple write messages have been transmitted.

To illustrate how starvation can occur in a multiprocessor computer system 10 in which the reject/resend protocol is used, refer to FIG. 5. FIG. 5 is a block diagram showing an example of the multiprocessor computer system 10 in which systemA, systemB, and systemD have sent a write request to the message queue 34 of adapterC 18 in systemC, shown by the dashed arrows. If the message queue in adapterC is full with systemA and systemB messages, then systemD's write messages will be rejected. Although systemC may be constantly processing its messages, unfortunate timing would allow systemA and systemB to refill the incoming systemC message queue before systemD messages are resent. Thus, systemD could be starved for service.

The Applicant of the present application has determined that split-response buses, such as SerialExpress, not only suffer from starvation, but also from deadlock in the following situations: conflicting concurrent PCI Bus accesses, conflicting processor and same-level reads in PCI topologies, conflicting hierarchical reads, and restricted ISA-card accesses, each of which is explained further below.

Conflicting Concurrent PCI Bus Accesses

The SerialExpress bus 22 is ideal for attaching sets of peripheral component interconnect (PCI) cards to a computer system having one or more processors. Each of the PCI cards are connected via a PCI bus, and the PCI bus is connected to the SerialExpress bus 22 through a PCI adapter. In large systems, more than sixty PCI adapters can be indirectly attached to intermediate SerialExpress bus interconnects.

Figure 6:
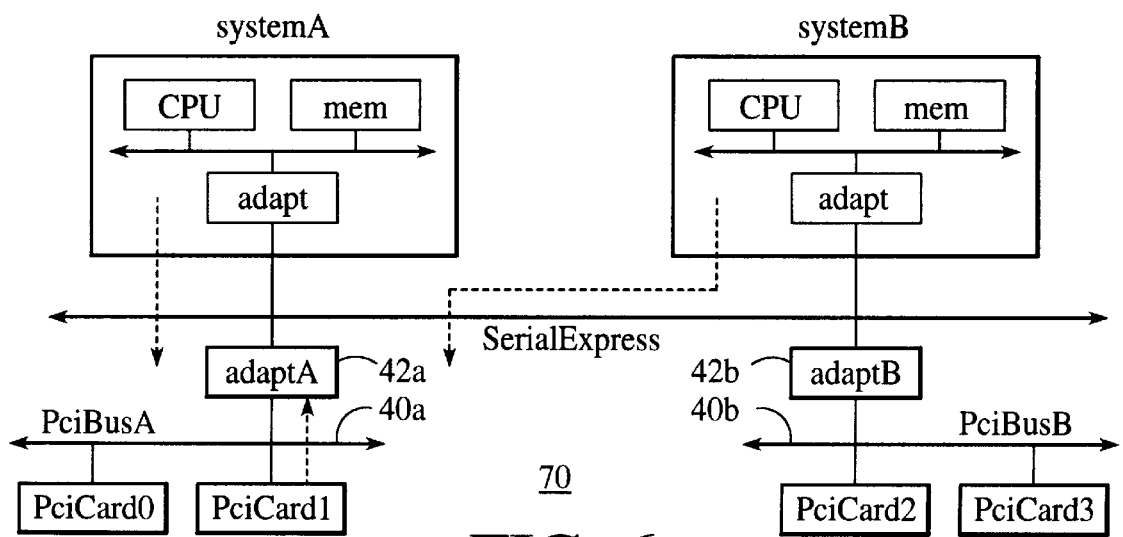
FIG. 6 is a block diagram depicting a PCI-bus multiprocessor computer-system configuration.

FIG. 6 is a block diagram depicting a multiprocessor system 70 that includes computer systemA and systemB of FIG. 1 and two PCI buses, PciBusA 40a and PciBusB 40b. PciBusA and PciBusB are coupled to SerialExpress bus 22 by adapterA 42a and adapterB 42b, respectively. Coupled to PciBusA are PciCard0 and PciCard1. Coupled to PciBusB are PciCard2 and PciCard3.

To improve the effective memory latency and bandwidth, as in SerialExpress buses, PCI allows its writes to be posted, in that a PciBusA write subaction (herein referred to a write request) sent towards the SerialExpress bus appears to complete when it has been queued into adapterA, but before it has actually been performed on the SerialExpress bus. Special ordering constraints within adapterA ensure that the posting of these write transactions is transparent to software. These ordering constraints delay the completion of adapterA's PciBusA reads (reads sent from the PCI bus to the SerialExpress bus) until a AdapterA's posted SerialExpress write (a write from Serial Express to the PCI bus) has been completed.

PCI reads are locally circuit switched, meaning that before a read can complete that is sent by a requestor from one PCI bus to another PCI bus, both PCI buses must first be simultaneously owned or controlled by the requester. In FIG. 6, for example, in order for a read transaction from PciCard0-to-PciCard2 complete, PciCard0 must own PciBusA, and PCIBusB must be owned by adapterB on behalf of PciCard0).

The multiprocessor system 70 may also suffer from potential circuit-switched read deadlocks across PciBusA and PciBusB. In this case, assume that PciCard1 is trying to read data on PciCard3; PciCard2 is concurrently trying to read data on PciCard0, where the read requests are shown by dashed arrows. Each becomes a bus master on its host PCI bus and the respective adapters 40a and 40b forward the read request to the remote PCI bus. Since each of the PCI cards requires ownership of the remote bus to complete its read, and that ownership release only occurs when the read initiated on that bus completes, the system is deadlocked. To avoid bus-dependency deadlocks, some of the circuit-switched requests are rejected. Rejection involves having the response return a CONFLICT status, whereupon the requester can resend the request. This reject/resent mechanism is sufficient to avoid deadlock, but livelock would occur where continuous retries of requests are sent without any request being serviced, unless one or more of the conflicting requests isn't rejected.

Conflicting Processor and Same-level Reads in PCI Topologies

In another example of a potential deadlock situation, assume that the processors in systemA and systemB have issued a split-response read request (a read subaction followed by a returned response subaction) of PciCard0 or PciCard1. AdapterA can queue one of these reads (the systemA read of PciCard0/PciCard1) even if a posted write is queued in the opposite direction. The second read request is assumed to be busied, because the processor may not support the reject/resend protocol. When incorrectly used between different levels of the PCI-bus hierarchy, the busying of these split read requests could lead to deadlocks, as illustrated in FIG. 7.

Figure 7:
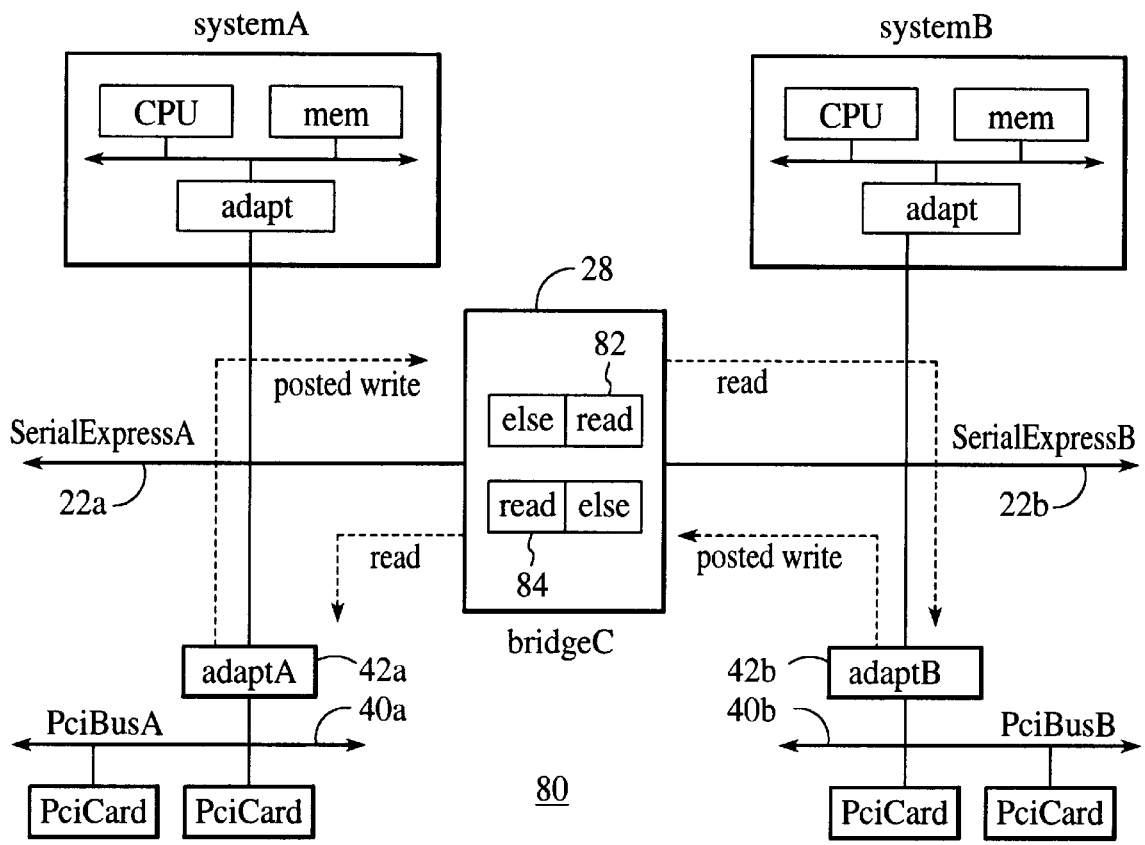
FIG. 7 is a block diagram illustrating conflicting read/write conflicts in a multiprocessor system that includes two PCI buses and two SerialExpress buses that are coupled by a bridge.

FIG. 7 is a block diagram illustrating conflicting read/write conflicts in a multiprocessor system 80 that includes multiple PCI buses and two SerialExpress buses 22a and 22b that are coupled by a bridgeC 28. In this case, bridgeC has queued a systemA-to-PciBusB read requests 82 and a systemB-to-PciBusA read requests 84. Other bridge traffic shown as "else" is generated by other nodes and fills the queues in bridgeC. Posted writes are queued in adapterA and adapterB that are directed to systemA and systemB, delaying the completion of read transactions on PciBusA and PciBusB, respectively. The system is deadlocked: the posted writes in adapterA and adapterB can't be completed (the bridgeC queues are full), reads from bridgeC can't be accepted by adapterA or adapterB (their read-request queues are full), the read requests in adapterA and adapterB can't be processed (the response queues in these bridges are full), and the response queues in adapterA and adapterB can't be emptied (ordering constraints delay these response returns until after the opposing-direction posted writes have completed).

To avoid such deadlocks, such topologies are prohibited. SystemA and system B must be at the top of the hierarchy, rather than separated by bridges that also forward PCI-to-PCI subactions.

Referring again to FIG. 6, although most PCI bus transactions are expected to be directed into system memory 16, the PCI cards are also allowed to access each other. Thus, mechanisms are needed to avoid deadlocks between a PciBusB-to-PciBusA read (which normally holds PciBusB until PciBusA has been acquired) and a PciBusA-to-PciBusB read (which normally holds PciBusA until PciBusB has been acquired).

In general, there may be multiple PCI Bus adapters (A, B, . . . , N), and in such situations, a rejection scheme is needed that breaks all potential bus-usage dependency deadlocks, but does not reject all read-request subactions.

Conflicting Hierarchical Reads

Figure 8:
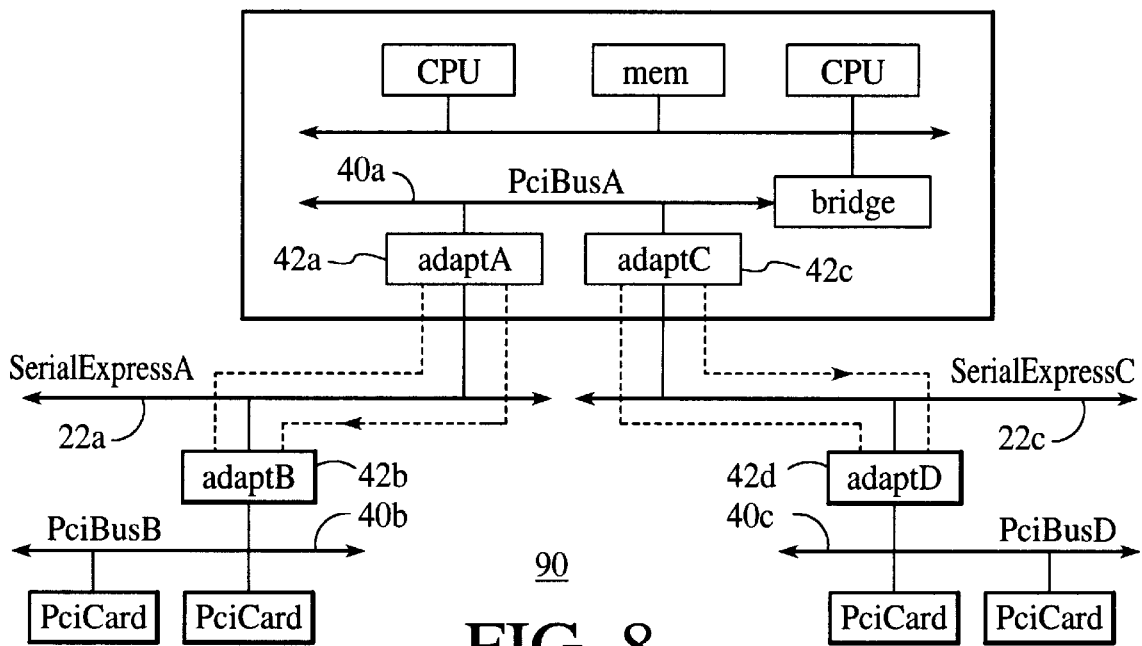
FIG. 8 is a block diagram illustrating a multiprocessor computer system having a PCI-bus hierarchy and multiple SerialExpress buses.

FIG. 8 is a block diagram illustrating a multiprocessor system 90 having a PCI-bus hierarchy. In this example, the two SerialExpress interconnects 22a and 22c are used as intermediate I/O extension buses. One of the buses (in this example, PciBusA) is selected to be the root bus. A leaf bus is a bus connected to adapters that route transactions towards the root, such as PciBusB and PciBusD. Transactions sent from a leaf bus to the root bus are called bottom-up transactions, and transactions sent from the root bus towards a leaf bus are called top-down transactions.

Each of the adapters 42 have attachments to two buses, and the circuitry associated with those attachments is called a portal. The top-down portals (closer to the root than the leaves) on adapterB and adapterD are shown by the dark triangles.

In this type of topology, conflicting reads could livelock, as follows. Assume that the first read begins from PciBusA-to-SerialExpressA-to-SerialExpressB-to-PciBusD before being rejected by adapterD (in favor of a PciBusD-to-SerialExpressC read). Assume that the second read goes from PciBusD-to-SerialExpressC-to-SerialExpressA-to-PciBusB before being rejected by adapterB (in favor of a PciBusB-to-SerialExpressA read). Since these rejections could continue indefinitely, the system is live locked.

Restricted ISA-card Accesses

Figure 9:
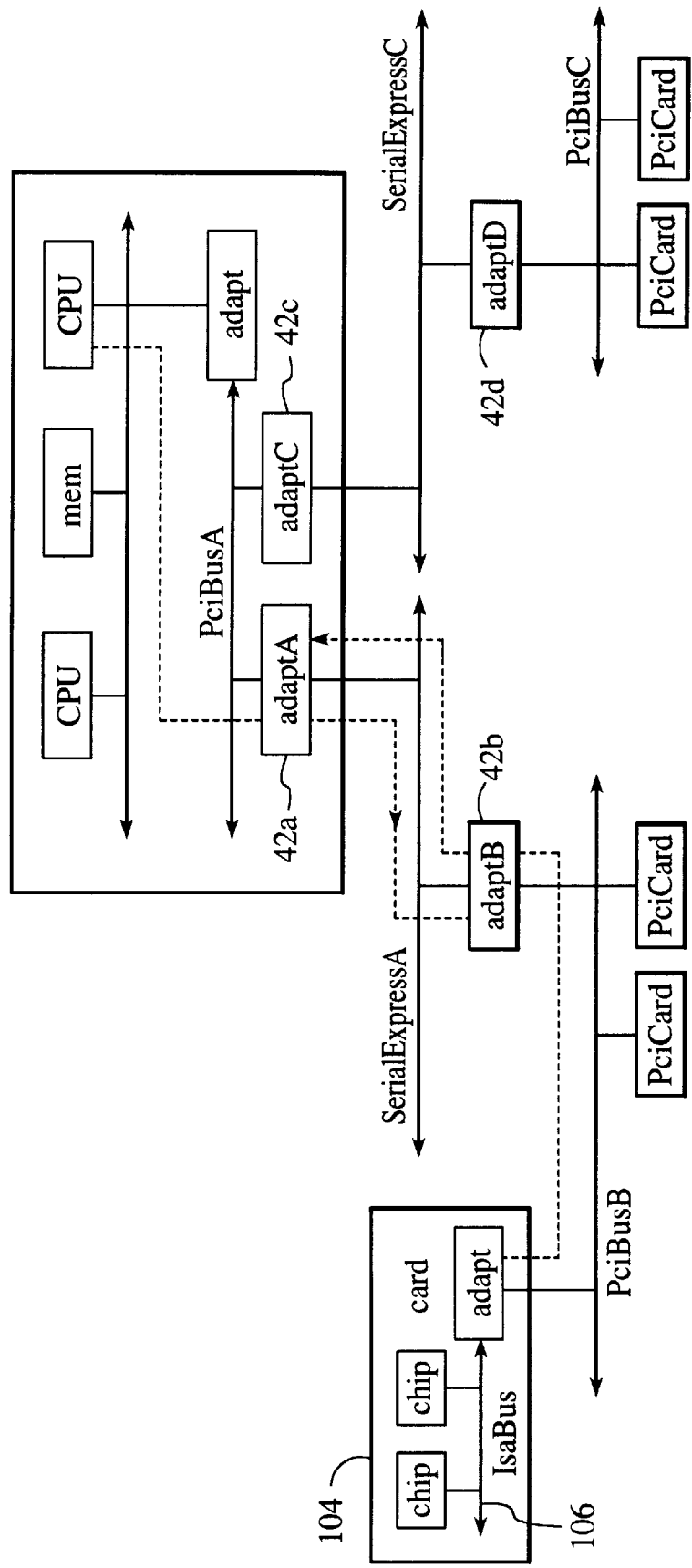
FIG. 9 is a block diagram illustrating a multiprocessor system having a PCI-bus hierarchy and an ISA-bus expansion card.

For design expediency, some PCI cards are based on ISA-bus chip designs, as illustrated in FIG. 9. FIG. 9 is a block diagram illustrating a multiprocessor system 100 having a PCI-bus hierarchy in which an expansion card 104 includes an ISA-bus 106.

ISA-based PCI cards 104 present a design challenge, since ISA-based cards 104 don't support full-duplex operations. ISA-based PCI cards 104 are half-duplex: once a chip has completed arbitration for the local ISA bus 106, an incoming PCI-to-ISA transaction cannot complete (they are continually busied) until the outgoing ISA-to-PCI transaction completes.

The half-duplex nature of ISA-bus based cards 104 is due to the design of the ISA bus 106; after the bus 106 has been acquired, the transaction must complete before the bus 106 can be released. There is no provision for bus 106 to busy a read or write request. To avoid deadlocks, ISA-based cards 104 are not allowed to talk to each other.

As described by the foregoing discussion, conventional reject/retry and busy schemes are inadequate to reduce the starvation and deadlock situations that may occur on split-response multiprocessor systems.

The present invention is a method and system for avoiding both starvation and deadlocks in a split-response multiprocessor computer system. The method and system avoids starvation and deadlocks by encoding precedence information in subaction packets to determine which subactions should be processed and which should be rejected during a conflict between subactions. In one embodiment, the precedence information identifies the age of the subaction based on a time stamp such that the oldest packets are processed first. In another embodiment, the precedence information identifies the interfaces from which the packet originated. In another embodiment, other precedence information identifies where the requesting node is located in the system hierarchy. Using this precedence information, at least one request will be processed during a conflict, ensuring forward progress over the buses in the system.

In a preferred embodiment, the precedence information is encoded into subactions by providing additional fields to a conventional SerialExpress packets. To more particularly describe the preferred embodiment of the present invention, refer now to FIG. 10.

Figures 10, 12:
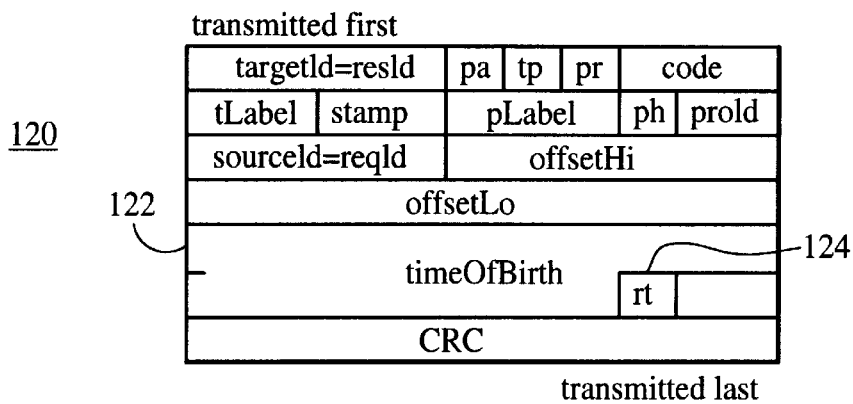
FIG. 10 is a block diagram depicting the contents of an extended packet of the present invention that includes additional precedence information for avoiding starvation and deadlocks.
FIG. 12 shows a table of the values placed in the resend type field 124 to indicate the precedence of resent packets.

FIG. 10 is a block diagram depicting the contents of an extended packet 120 of the present invention that includes additional precedence information for avoiding deadlocks. In addition to all the fields of a standard SerialExpress packet, the extended packet 120 includes a timeOfBirth field 122 and a resend type field 124.

According to the present invention, the timeOfBirth field 122 is used in a message-queue reservation scheme to specify the age of a subaction request so that starvation may be avoided by processing those subactions that have been resent for the longest period of time.

Resolving Starvation Using Message-queue Reservations

Figure 11C:
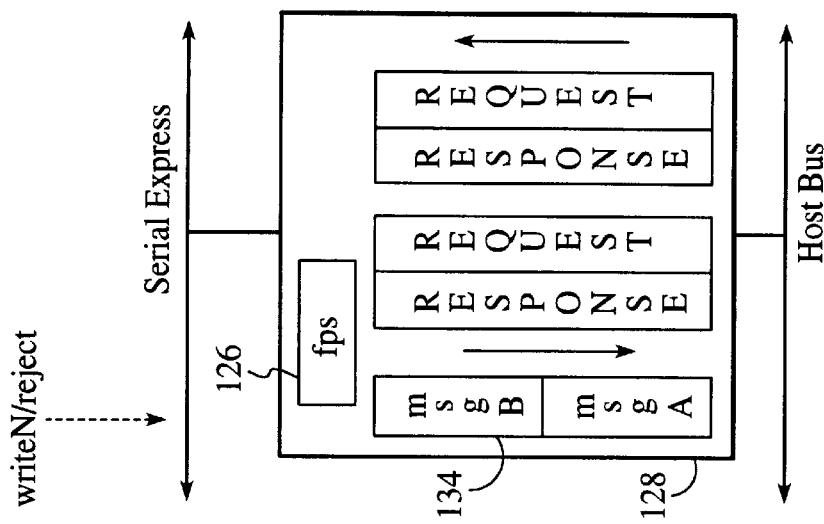
FIGS. 11a–11f are block diagrams showing how message-queue reservations can be used in an adapter 18 to avoid starvation.
Figure 11B:
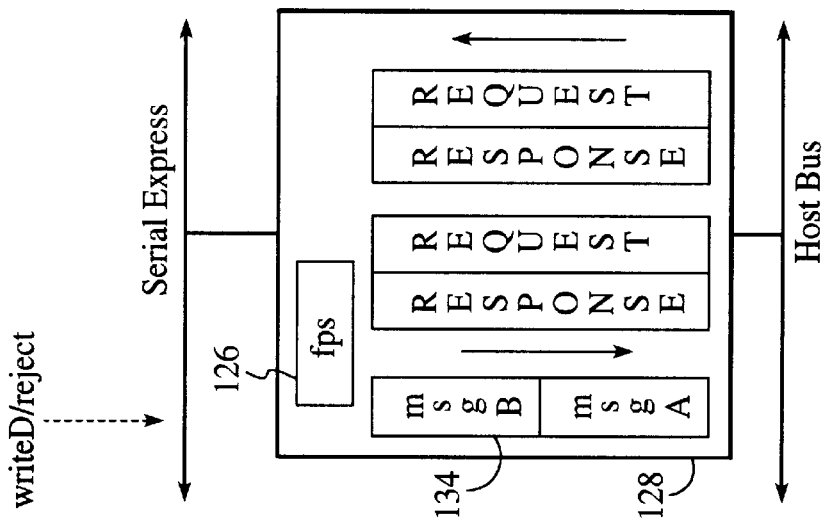
Figure 11A:
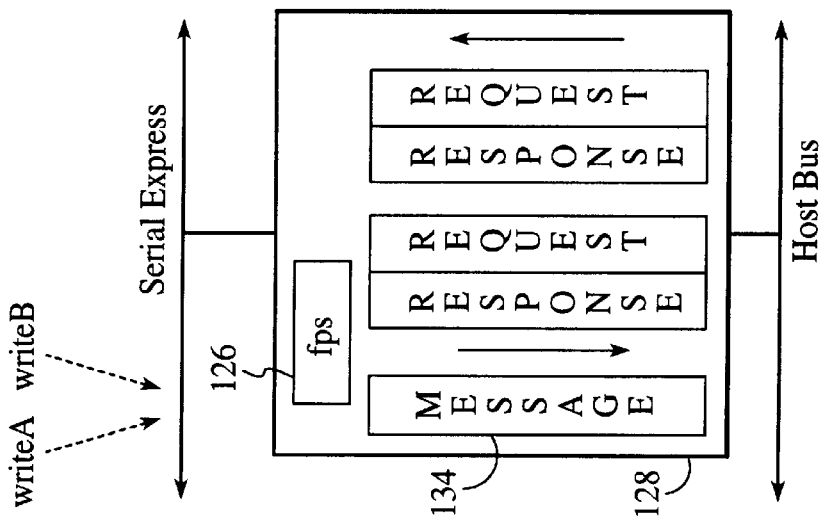

FIGS. 11a–11f are block diagrams showing how message-queue reservations can be used in a host adapter 128 to avoid starvation. According to the present invention, the adapter 128 includes a forward-progress-screen (fps) 126 register in order to implement the message-queue reservation scheme. FIG. 11a shows the host adapter 128 receiving two write request WriteA and WriteB from a SerialExpress bus. Normally, these writes are placed into a message queue 134. The queued requests are shown as MsgA and MsgB in FIG. 11b. If the message queue 134 is full when another writeD request is received, a reservation is established in the fps register 128, and a response with a CONFLICT status is returned, as illustrated in FIG. 11b. Other write requests for the filled message queue are similarly rejected, as shown in FIG. 11c. The fps-reservation is updated (as necessary) in favor of the incoming write request having the oldest timeOfBirth value.

Until the reservation is cancelled, one of the message-queue entries is never used for other purposes. Thus, newer message-queue writes (such as writeA) are rejected even though message-queue space is available, as shown in FIG. 11d. The reservation inhibits use of the last message-queue entry until the oldest request (in this case, writeD) is resent, as illustrated in FIG. 11e.

Figure 11F:
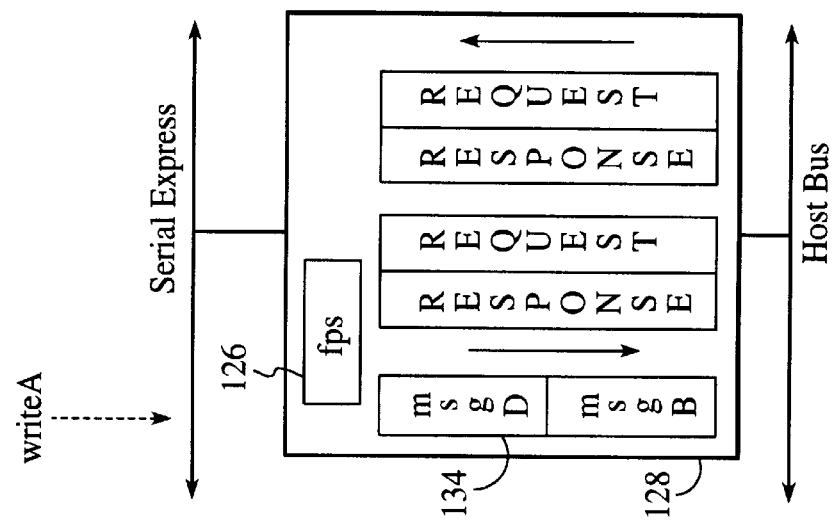
Figure 11E:
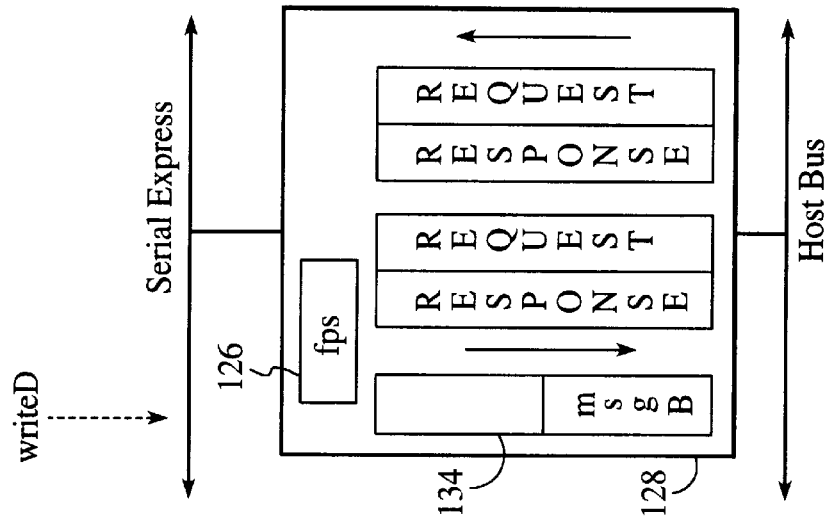
Figure 11D:
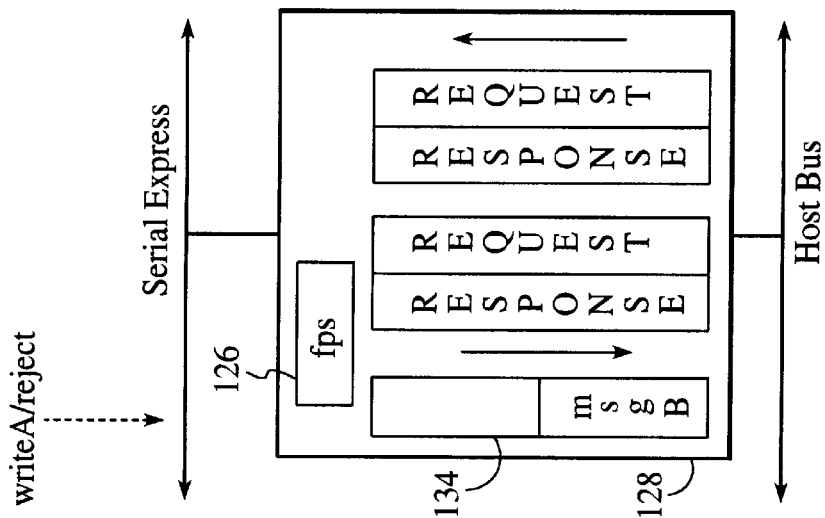

The reservation is cancelled and becomes available for other writeA requests when the affiliated write is accepted, as shown in FIG. 11f. If the message queue 134 remains full, the next message-queue write establishes a new fps-reservation value. Since the reservations are always assigned to the oldest transaction being resent, the last message-queue entry is allocated fairly and starvation cannot occur. This form of starvation avoidance, however, does not ensure complete fairness, because other message-queue entries are accepted on a first-come-first-served basis.

To remain effective, reservations are discarded if the expected request is never resent. A request would never be resent, for example, if the requester is reset before the previously rejected request can be resent. To properly discard stale reservations, a timeout protocol is used: the reservation is discarded if the expected request-resend is not received within a timeOfLife interval. The timeOfLife interval is the worst-case lifetime of a split-response transaction and can be derived by evaluating the timeOfDeath fields within the request packet.

In a preferred embodiment, the timeOfBirth field is slightly less than 64-bits in size, which allows least-significant bits to be used for other purposes. Two of these bits are used for the resend type field 124. According to the present invention, the resend type field 124 is used within other types of rejected packets. Referring now to FIG. 12, a table is shown of the values placed into the resend type field 124 to indicate the precedence of resent packets. The precedence of resent packets may be labeled as SPLIT, MIN, MID, or MAX.

The SPLIT label identifies the requester as a true split-response requester. The MIN label identifies the requester as a higher-level adapter requester, which has a lower precedence because a (potentially) half-duplex address is being accessed.

The MID label identifies the requester as a lower-level adapter requester. Since lower-level adapters can communicate with each other, conflicting packets may have the same MID level-precedence values. In this case, the requestor's node Id, which is the sourceID field in packet 120 of FIG. 10, determines which of the requests are rejected.

The MAX label identifies the requester as a higher-level adapter requester, which has a higher precedence because a (known to be) full-duplex address is being accessed.

Instead of providing an extended packet 120 that includes precedence labels to determine a packets precedence during a conflict, a second preferred embodiment of the present invention implies precedence from information already within a standard packet. The implied precedence may be source ID-based or offset-based.

Implied SourceId-based Precedence

Serial Express is expected to support relatively-simple PCI-bus hierarchies, such as the topology illustrated in FIG. 8. Within such topologies, the extended packets 120 are not needed if the packet precedence (MIN, MID, MAX) can be implied from the transaction's source Id value. To correctly imply a request's precedence level, adapters could be pre-configured (by system software) with knowledge of other adapter locations. A bit within adapterA, for example, would enable this to be the higher-level PciBus adapter; other bits should indicate which of the local SerialExpress nodes are lower-level PciBus adapters.

For adapterB, for example, a bit would enable the adapter to be one of the lower-level PciBus adapters; other bits could indicate which of the local SerialExpress nodes are lower-level nodes; a register could specify the nodeId of the higher-level PciBus adapter. When these registers are properly configured, the identifier and hierarchical position of adapterA, adapterB, and adapterD would be known to each other.

With this knowledge, requests from adapterB and adapterD would not need an extended packet 120, since a MID level-precedence for lower-level sources would be implied. The MIN-level requests from adapterA would not need an extended packet 120, since a MIN level-precedence for higher-level sources would be implied. An extended packet 120 would be needed to specify a MAX level-precedence from the higher-level adapterA source. Since the extended packet 120 is only required on these infrequently sent packets, the average packet size is minimally impacted by the extended packet overhead.

Some buses (such as Serial Bus) do not provide an extended-packet capability. On such buses, adapterA can be assigned a pair of nodeId addresses. The even nodeId address would be used when sending MIN-precedence packets; the odd nodeID address would be used when sending MAX-precedence packets. This would allow adapterB and adapterC to identify adapterA's MIN- and MAX-precedence packets based on the least-significant bits of the transaction's sourceId identifier. Although this technique complicates other portions of the system design (system software has to support dual-nodeId components), this technique allows the precedence-based PCI-adapter deadlock-avoidance protocols to be applied to a wider range of split-response system buses.

Implied Offset-based Precedence

The implied offset-based precedence is used where a consistent address-mapping convention is used by higher-level and lower-level PciBus adapters. In this case two more-significant bits the in the request packet's address offset field may be used to specify its level-precedence value. This requires allocation of four address-offset subspaces, each one of which aliases to the same range of PciBus addresses. The SPLIT, MIN, MID, MAX precedence levels are implied by which of the node's four address-offset subspaces is accessed.

Although this eliminates the need to support extended packets 120, the use of address-offset subspaces reduces the size of the range of address offset values available for other uses. Also, a consistent convention is required, so that the level-precedence intent of the requester and the level-precedence interpretation of the responder are the same.

Whichever method is chosen to provide the precedence level information, the present invention uses the precedence levels to apply precedence-based rules to conflicting subactions to determine which of the conflicting subactions are accepted and which are rejected. The rules for setting the precedence of subactions are separated between postable write requests and all other type of requests.

In a preferred embodiment, postable write request are assigned a higher precedence than any other type of request. The rules for assigning precedence levels for other (not postable write) requests depends on the request packet's precedence information; the MIN, MID, and MAX labels have the lowest-through-highest precedence. For the case of two MID-level requests, which requests are rejected by nodeA is determined by the sourceId of the incoming request, the nodeId of nodeA, and the targetId of the outgoing request. The application of these precedence rules to specific conflict situations will now be explained.

Resolving Standard Processor Accesses

Referring again to FIG. 6 showing conflicting processor accesses, avoiding deadlocks requires the use of the reject/resend protocols on transactions sent between PCI adapters 42. Since such protocols may not be supported by all processors (or their DMA adapters), the adapters 42 are expected to use the busy/retry protocols to flow-control higher-level initiated accesses of PCI-card addresses.

In a preferred embodiment, the use of SPLIT-labeled requests is limited to nodes at the higher levels of the adapter topology. A subaction packet that is not an extended packet 120 implies that the request is a SPLIT-response request. The processor 14 is expected to generate such (implied) SPLIT-labeled reads and adapterA can queue one of these reads (a systemA read of PciCard0/PciCard11) even though a PciBusA-to-SerialExpress write is posted in the opposite direction. Ordering constraints, that delay adapterA's request forwarding to PciBusA (until a previously posted write to PciBusA completes) and the returning of the affiliated response to SerialExpress (until a previously posted write from PciBusA completes), are sufficient to ensure write-ordering transparency.

Resolving Conflicting Same-level Reads

Referring still to FIG. 6, recall that a same level read conflict may occur between a PciBusB-to-PciBusA read and a PciBusA-to-PciBusB read. Such same-level read-read conflicts are caused by opposing traffic, rather than an overload of same-direction traffic as in conflicting processor accesses.

According to the present invention, packets involved in a same-level read—read conflict are assigned a MID, rather than SPLIT label. Each of these MID-level read requests may be concurrently transmitted to and received by the opposing adapter. Conflict resolution requires the rejection of one (or more) of these read requests, which is done by returning a CONFLICT-status response.

A (potential) read—read conflict is detected within adapterA when a Serial Express-to-PciBusA read is received while a PciBusA-to-Serial Express read is active. Because some of these conflicting requests must be rejected (to avoid deadlocks) but at least one cannot be rejected (to ensure forward progress), all but one of these potentially-conflicting reads is rejected.

According to the present invention, the rejection rules for conflicting MID requests are based on the PCI adapter's nodeId identifiers. The intent is to reject all but one of the dependent same-level read requests. The previously-accepted read request on adapterA is rejected unless both of the following conditions are true:

1) The adapterA nodeId is less than the sourceId within the incoming SerialExpress-to-PciBusA read-request; and 2) The adapterA nodeId is less than the targetId within the outgoing PciBusA-to-SerialExpress read-request.

These conditions ensure that, within any set of potentially-deadlocking MID read requests, the adapter with the lowest nodeId has its incoming read-request completed first. Deadlock is avoided by rejecting other requests; starvation is avoided by not rejecting one of these requests.

Resolving Conflicting Hierarchical Reads

Within PCI hierarchies, the conflict-resolution precedence of the present invention accounts for hierarchical relationships, such as that shown in FIG. 8. To ensure forward progress of transactions, the hierarchical relationship affect which read transactions are rejected during a conflict. The full-duplex top-down read-requests have precedence over the bottom-up read-requests, and reads that have taken their bottom-up path and are continuing on a top-down path have precedence over bottom-up reads. In a sense, those reads that have acquired a longer path have precedence over those that have acquired a shorter path.

The modified deadlock avoidance algorithm accounts for this hierarchical information by using a MIN and MAX labels to establish the precedence of resent half-duplex and full-duplex read-requests. Request subactions are originally sent from a requesting node with a MIN label. MIN labeled requests are rejected by PCI adapters during a conflict in favor of MAX labeled requests.

For example, referring again to FIG. 8, adapterA rejects an incoming MID-labeled SerialExpressA-to-PciBusA read-request because a MAX-labeled PciBusA-to-SerialExpressA request is active. In adapterB, the incoming MAX-labeled SerialExpressA-to-PciBusB read-request packet is accepted, causing a MID-labeled PciBusB-to-SerialExpressA read-request packet to be busied when its conflict response returns.

After rejecting a MIN labeled request, the PCI adapter indicates in the reject response whether the request was attempting to access a half-duplex address or a full-duplex address. Based on the indication in the reject response, the requesting node changes the precedence of the request before resending the request. If the reject response indicates a half-duplex is being accessed, then the resent request keeps the MIN precedence label. If the reject response indicates a full-duplex is being accessed, then the resent request is given a MAX precedence label.

A different set of hierarchical precedence is required if a lower-level ISA-based card is accessed from a higher level of the hierarchy, as shown FIG. 9.

Resolving Restricted ISA-bus Accesses

To further simplify the deadlock avoidance rules, symmetric communication between ISA-based cards is prohibited to avoid system deadlocks: ISA-based cards 104 are only allowed to communicate with same-level PCI cards or full-duplex Higher-level (closer to the root) nodes. To further avoid deadlocks, writes sent to ISA-based cards from the CPU are switched (rather than posted), and bottom-up read requests from ISA-based cards have precedence over the normal top-down transactions.

Thus, the processing of top-down ISA-card accesses that have a low precedence differs from the previously-mentioned processing of top-down full-duplex card accesses that have a high precedence.

To enforce the desired read-request precedence, lower-level adapters (adapterB and adapterD in FIG. 9) are provided with sets of base/bounds registers that distinguish between half-duplex ISA-based addresses from the addresses of full-duplex PCI cards. The higher-level PciBus-to-SerialExpress adapters (adapterA and adapterC) provide a MIN label in their first-sent read requests, but the rejections from lower-level adapters (adapterB and adapterD) indicate whether a half-duplex or full-duplex address was accessed. This allows the MAX precedence to be used when a rejected full-duplex access is resent, for example, from adapterA-to-adapterB.

Having the lower-level responder eliminate the half/full-duplex checks simplifies address-routing hardware in the higher-level adapter. Instead, the ISA-card address checks are done at a more convenient lower-level location where fewer address ranges need to be checked.

This modified deadlock avoidance algorithm accounts for the ISA-bus address information. Referring to adapterC in FIG. 9, incoming MID-labeled SerialExpressC read-request packets are accepted when a MIN-labeled outgoing PciBusA request has been rejected. In adapterD, a MIN-labeled incoming SerialExpressC read-request packet is rejected if an outgoing MID-labeled SerialExpressC read-request packet is active.

To enforce the desired half-duplex compatibility, higher-level adapters (such as adapterA) are required to switch their MIN-labeled write transactions. However, full-duplex writes can be posted in adapterB (when their full-duplex nature is confirmed), or can be posted in adapterA after being rejected by adapterB.

Figure 13:
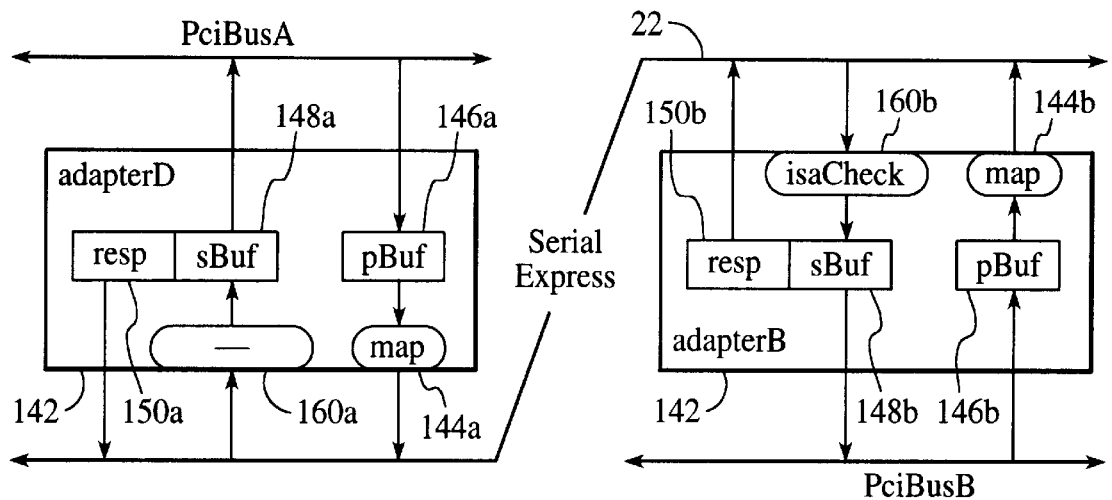
FIG. 13 is a block diagram showing the components of a higher-level adapter 140 and lower-level adapter 142, shown here as adapterD and adapterB, respectively.

In order to implement the above precedence rules, a PCI adapter coupled to a root PCI bus (or a closer towards the root PciBus) and a PCI adapter coupled adapter to a leaf PCI bus (or closer towards the leaf PCI bus) have the same designs, but their enabled functionality would be different, as illustrated in FIG. 13.

FIG. 13 is a block diagram showing the components of a higher-level PCI adapter 140 and lower-level PCI adapter 142, shown here as adapterD and adapterB, respectively. Both of the adapters 140 and 142 include respective map hardware 144, a hardware buffer called Sbuf 148, a hardware sequencer called pBuf 146, and a response queue 150.

In higher-level adapterD 140, the map hardware 144a is used to map PciBusA addresses into ranges of SerialExpress addresses, where a different range is typically required for each lower-level adapter. In adapterB 142, the map hardware 144b has a similar purpose, determining which addresses should be routed into the higher-level adapter or other lower-level adapters. The pBuf 146 and the sBuf 148 are used to queue requests, as described below.

The lower-level PCI adapter 142 also includes address checking hardware, called isaCheck 160b, that determines which of the incoming Serial Express transactions are destined for half-duplex PCI addresses and therefore should return a MIN conflict-precedence. On the higher-level PCI adapter 140, the isaCheck hardware 160a would be disabled and not used.

Incoming Serial Express request subactions in both Adapters 140 and 142 are queued in the sBuf 148 hardware buffer. The response-queue 150 is provided for generating responses that may be returned when an incoming request-specified transaction completes or when an incoming request is rejected.

Incoming requests destined for the PCI bus activate the hardware sequencer Pbuf 146. Each PCI-adapter 140 and 142 also provide hardware (not shown) that forwards the PCI transaction to the PCI bus by generating a SerialExpress request (after the PCI bus address has been received) and processing the returned SerialExpress response (that provides the data necessary for completion of read transactions).

The sBuf 148 in PCI adapters 140 and 142 also include a bit (not shown) that indicates whether the state of the sBuf 148 is passive or active. A passive state means that the request queued in the sBuf 148 is being blocked and that therefore other incoming request should be rejected. An active state means that the adapter has not yet detected whether the queued request is being blocked, or has determined that the queued request is not being blocked.

The components of the PCI adapters 140 and 142 of the present invention are used in potential deadlock conditions using a set of detailed precedence rules. Basically the rules are categorized into two sets. One set of rules applies to the queuing of incoming request that are received by the PCI adapters 140 and 142, and the other set of rules applies to the processing of the queued request. The queuing and processing precedence rules are explained first for lower-level PCI adapter 142 operation, followed by an explanation for higher-level PCI adapter operation 140.

Lower-level PCI Adapter Operation

Referring again to FIG. 13, SerialExpress requests are placed into an incoming-request queue (not shown) before being processed by a PCI-adapter. When the incoming-request queue becomes full (a transient condition) busy/retry protocols inhibit the acceptance of additional incoming-request queue entries. Processing of incoming-request queue entries is inhibited until the resp queue is empty, since request processing may generate a response.

According to the present invention, incoming-request queue entries are relabeled before being processed. Depending on adapter state, the incoming request may be queued in sBuf for delayed processing, or may be converted into a response and saved in the resp queue.

Figures 14A, 14B:
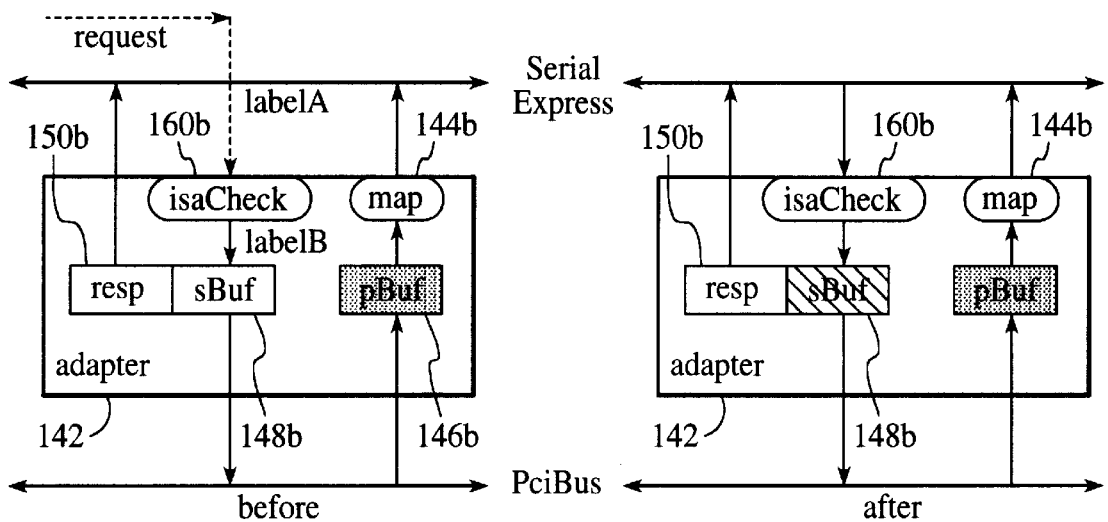
FIGS. 14a and 14b are block diagrams showing the components of a lower-level PCI adapter when accepting a SerialExpress request.

FIGS. 14a and 14b are block diagrams showing the components of a lower-level PCI adapter 142 when accepting a SerialExpress request. A key is also shown that indicates various queue contents using shading and cross-hatching. FIG. 14a shows a request being received by the lower-level PCI adapter 142 and then queued as an active request in sBuf 148b for delayed processing, as shown in FIG. 14b.

Figures 15A, 15B, 16:
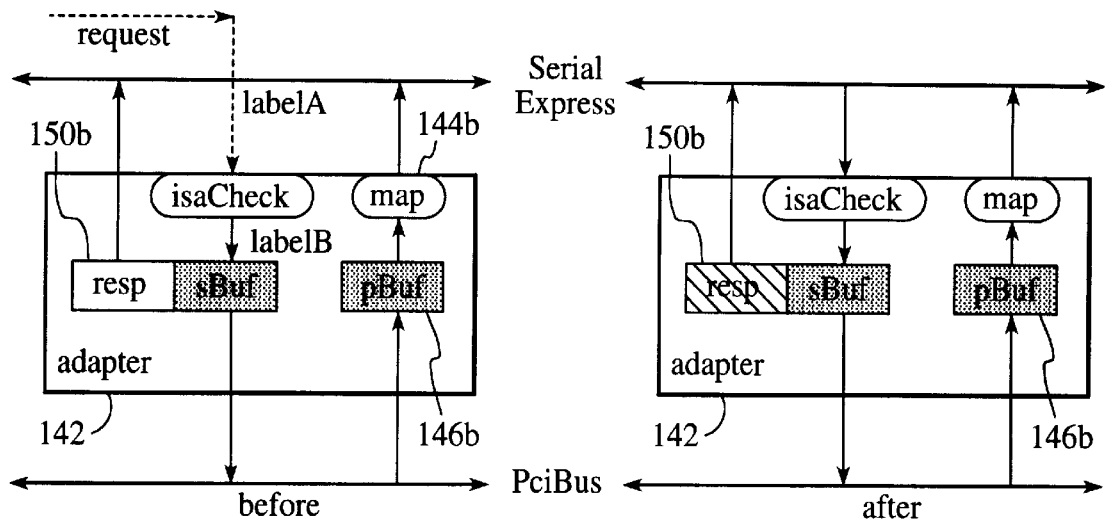
FIGS. 15a and 15b are block diagrams showing the components of a lower-level PCI adapter when rejecting a SerialExpress request.
FIG. 16 is a table showing the rules followed by the isaCheck hardware to assign internal precedence labels to SerialExpress requests.

FIGS. 15a and 15b are block diagrams showing the components of the lower-level PCI adapter 142 when rejecting a SerialExpress request. The request is received by the lower-level PCI adapter 142 in FIG. 15a, and then, converted into a response and saved in the resp queue 150b, as shown in FIG. 15b. The response is then sent out on the SerialExpress bus with a CONFLICT status.

To decide whether to accept or reject a request, the isaCheck hardware 160b in the lower-level PCI adapter 142 assigns internal precedence labels to the incoming request. The internal precedence labels are used internally by the PCI adapter 142 and are not included in the packets sent to other nodes, as in the precedence labels SPLIT, MIN, MID, and MAX.

In a preferred embodiment of the present invention, incoming request are assigned the following internal precedence labels: May, Min, Mid, Max, and Bad. The internal precedence labels have a distinct name-capitalization convention, to avoid confusion with the MIN, MID, and MAX precedence-level names of the incoming request. The internal precedence labels are assigned to incoming request according to the rules described in FIG. 16.

FIG. 16 is a table showing the rules followed by the isaCheck hardware 160b to assign internal precedence labels to SerialExpress requests. The label assigned to each request depends on the request type (read or write), its incoming precedence level (MIN, MID, or MAX), and whether the address corresponds to a half-duplex or full-duplex address. Each row of the table is explained below.

Row1: A half-duplex MIN-precedence write maintains its Min precedence.

Row2: A full-duplex MIN-precedence write is assigned a higher May precedence, allowing it to be posted (if pBuf is empty) or rejected if there is an opposing pBuf-queue conflict. Such rejections allow the higher-level requester to reassign a consistently interpreted MAX label on the retried write.

Row3: The precedence level of an half- or full-duplex read-MIN request is unchanged. A full-duplex read maintains its Min label, rather than being assigned a Max label, to enable opposing conflict rejections. Such rejections allow the higher-level requester to reassign a consistently interpreted MAX label on the retried read.

Rows 4 and 5: The consistent MID/MAX precedence of full-duplex reads and writes is maintained.

Row6: If the MID/MAX labels are incorrectly assigned to accesses of half-duplex addresses, a distinct Bad label is assigned. The Bad label assignment aborts forwarding of these erroneous requests; the returned response informs the requester of the half-duplex nature of these addresses.

FIG. 17 is a table describing the rules the lower-level PCI adapter follows when processing the incoming-request queue subactions.

Row1: When the incoming request has any internal precedence label other than Bad, the servicing of the incoming-request queue is deferred if there is no opposing conflict, since incoming requests can be safely busied until the sBuf entry is emptied by the normal request/response processing steps. Note that the sBuf-queue processing converts requests from the active-to-passive mode when opposing conflicts are detected.

Row2: When the incoming request has any internal precedence label other than Bad and sBuf is passive (indicating there is an opposing pBuf conflict), each incoming request-queue entry is converted into CONFLICT-status response and placed into the resp queue, as illustrated in FIGS. 18a and 18b. Rejection of these conflicting requests is necessary to avoid queue-usage deadlocks.

Row3: Incoming requests that have a Bad internal precedence label, which represents erroneously labeled requests, are also converted into a CONFLICT-status response, as illustrated in FIGS. 18a and 18b. This rejected response informs the requester of this level-precedence inconsistency error.

Row4: In the normal case, when the sBuf queue is empty, the next non-Bad-labeled incoming-request queue entry is transferred into the previously empty sBuf queue and the sBuf state is marked active.

Lower-level SerialExpress Request Servicing

The processing of sBuf-queued SerialExpress requests occurs when the resp queue is empty and has precedence over the servicing of incoming-request queue entries. The processing of sBuf entries depends on the opposing pBuf-queue state as illustrated in FIG. 18.

FIGS. 18a and 18b are block diagrams showing the servicing of SerialExpress request by a lower-level PCI adapter 142. FIG. 18a shows a SerialExpress request queued in sBuf, and FIG. 18b shows that successful processing converts the sBuf-queued request into a resp-queued response that is transmitted over the SerialExpress. Rules for processing of sBuf-queued requests assume a Mid-level precedence for the pBuf requests, as described in FIG. 19.

FIG. 19 is a table describing the rules the lower-level PCI adapter follows when servicing SerialExpress requests. The idcheck in the table is preferably performed by the following C code:

idCheck=((sBuf.sourceId>nodeId)&&
  (pBuf.targetId>nodeId))? KEEP:TOSS.

Thus, idCheck is KEEP if the node's nodeId is less than the sourceId of the sBuf-queued packet and less than the targetId of the pBuf-queued packet. As mentioned above, a KEEP value is used to resolve MID-level conflicts (the sBuf request is not rejected if isaCheck yields a KEEP)

Row1: The posting of an sBuf-queued write is delayed, while there is an pBuf-queued read. This delay, which changes sBuf's mode to passive, is mandated by the posted-write/read-response ordering constraints.

Row2/Row3: The servicing of this higher precedence sBuf-queued read is delayed by a lower-precedence pBuf-queued read, since the PCI bus is occupied. This delay, which changes sBufs mode to passive, terminates when pBuf is emptied.

Row4: A full-duplex sBuf-queued write can be posted unless there is an opposing pBuf-queued read. To post such a write, 1) a completion response for the sBuf-queued write is placed in the resp queue and 2) the sBuf-queued write mode is changed from active-write to posted.

Row5: An sBuf-posted write can be serviced unless there is an opposing pBuf-queued read. Servicing involves the initiation of PciBus transaction: while the PciBus write is busied, the state of the sBuf-posted write doesn't change. When the PciBus write completes, the sBuf-posted write is discarded; if a PciBus-error condition is reported, an error bit is set in the adapter. The effects of this error bit are vendor dependent but are expected to be fatal.

Row6: An sBuf-posted write with an opposing pBuf-queued read is an error condition that (in the absence of a hardware failure) never occurs. This condition would violate the posted-write/read-response ordering constraint.

Row7: All sBuf-queued reads have lower precedence than an opposing pBuf-posted write, and are therefore rejected.

Row8: The not-postable writeMin has a lower precedence than an opposing pBuf-posted write, and is therefore rejected.

Row9: The precedence of readMin, writeMay, and write requests is lower than the opposing pBuf-queued read (that has an effective Mid precedence), and are therefore rejected.

Row10: This readMid request has a lower precedence than an opposing pBuf-queued read (that also has an effective Mid precedence), and is therefore rejected. Since both sBuf and pBuf requests have the same MID-level precedence, idCheck determines which has the highest overall precedence.

Row11: All not-postable requests are forwarded to PciBus when pBuf is empty. Processing of each request involves the initiation of a PciBus transaction; sBuf remains unchanged while the PciBus transaction is busied. When the PciBus transaction completes, the sBuf-queued request is converted into a PASS-status response (or FAIL-status, if a PciBus error condition is detected) and placed in the resp queue.

Lower-level Queuing of Incoming PCI Bus Request

Referring now to FIGS. 20a and 20b, the process of accepting incoming PCI bus requests by a lower-level PCI adapter are shown. In FIG. 20a, requests received from the PCI bus are checked by PCI-adapter hardware and conditionally activate pBuf processing. The busy/retry protocols inhibit the acceptance of incoming PCI bus requests during conflicts as well as transient queue-full conditions. In the absence of a opposing-request conflict, the PCI bus request is either accepted or posted into pBuf storage, as illustrated in FIG. 20b. Processing of PCI bus-initiated transactions is described in the table of FIG. 21. If none of these conditions are met, the PCI bus transaction is busied, and the pBuf state remains unchanged.

FIG. 21 is a table describing the rules the lower-level PCI adapter follows when processing PCI bus requests, where idCheck = ((sBuf.sourceId>nodeId)&& (pBuf.targetId>nodeId))? KEEP:TOSS.

As stated previously, during MID-level conflicts, the sBuf request is not rejected if isaCheck yields a KEEP, where idCheck is KEEP if the node's nodeId is less than the sourceId of the sBuf-queued packet and less than the targetId of the pBuf-queued packet.

Row1: A PCI bus read is processed, rather than busied, if pBuf is empty. Processing involves activating the pBuf entry, sending a SerialExpress request, and extending the PCI bus transaction until the expected SerialExpress response is received/processed.

Row2/Row3: A PCI bus read is processed, rather than busied, if there is a lower-precedence sBuf-queued request.

Row4: A PCI bus write is posted, rather than busied, if pBuf is empty. The PCI bus write completes normally. Row5 and Row6 define the processing steps for this posted write.

Row5: The servicing of a posted PCI bus write is suspended until the opposing sBuf-queued read request has been rejected, as mandated by posted-write/read-response ordering constraints.

Row6: The pBuf-posted write is performed when there is no sBuf-queued read. Processing involves sending a SerialExpress request and waiting for the expected SerialExpress response is received/processed.

Lower-level PCI Bus Transaction Completion

FIGS. 22a and 22b are block diagrams depicting PCI bus transaction completion by the lower-level PCI adapter. Completion of SerialExpress transactions (e.g. the processing of the returned SerailExpress responses) changes the adapter's pBuf state, typically completing the pBuf-queued transaction, as illustrated in FIG. 22a.

FIG. 23 is a table describing the rules followed by the lower-level PCI adapter when processing SerialExpress responses and their affiliated pBuf-queued requests.

Row1: A pBuf-posted write has the highest request and continues to be resent when a CONFLICT-FULL status is returned.

Row2: The pBuf-posted write completes (pBuf is marked empty) if a successful COMPLETE status is returned.

Row3: The pBuf-posted write is terminated (pbuf is marked empty) if an (erroneous) CONFLICT-HALF status is returned. An error bit may be set in the adapter, to log the completion-error condition.

Row4: A pBuf-queued read is resent if a CONFLICT-FULL status is returned and there is no sBuf-queued request.

Row5/Row6: A pBuf-queued read is resent if a CONFLICT-FULL status is returned and there is a lower level-precedence sBuf-queued request.

Row7: A pbuf-queued read is rejected when a CONFLICT-FULL status is returned and there is a postable (and therefore higher precedence) sBuf-queued write. The rejection involves aborting the PCI bus transaction, by asserting busy, and marking pBuf empty.

Row8/Row9: A pbuf-queued implied-Mid-precedence read is rejected when a CONFLICT-FULL status is returned and there is a higher precedence sBuf-queued read.

Row10: The pBuf-queued read completes if a COMPLETE-status response is returned. The extended PCI bus transaction is allowed to complete normally and pBuf is marked empty.

Row11: The pBuf-queued read terminates if a CONFLICT-HALF status response is returned, since this violates hierarchy-precedence rules. The extended PCI bus transaction is allowed to complete, with an error-acknowledge code, and pBuf is marked empty.

Row12: An sBuf-posted write may not exist when an opposing pBuf read is active. If allowed to occur, this would violate posted-write/read-response ordering constraints.

SerialExpress SPLIT-level Requests

Unlike other types of precedence labels, the use of SPLIT-precedence is restricted to top-down accesses through bridges and adapters, to avoid potential queue-use deadlocks. The SPLIT-precedence label is used by standard split-response capable requesters. The use of the SPLIT-precedence label simplifies the design of these SerialExpress requesters, since the reject/resend protocols aren't used on SPLIT-labeled requests.

FIGS. 24a and 24b are block diagrams showing a lower-level adapter queuing split-request received from the SerialExpress bus. In the preferred embodiment, adapters are provided with an additional buffer, called ebuf 160, in order to support split-request transactions. FIG. 24a shows the acceptance of a split-request from the SerialExpress bus. Such requests are placed into a distinct incoming-split-request queue (not shown) before being processed by PCI-adapter hardware. The busy/retry protocols inhibit the acceptance of incoming-split-request queue entries, during transient incoming-split-request-queue-full conditions. Whenever the eBuf 160 is empty, the adapter transfers entries from its incoming-split-request queue into the eBuf 160 queue, as illustrated in FIG. 24b. When copied into eBuf 160, the new entry is marked passive.

Figure 25A:
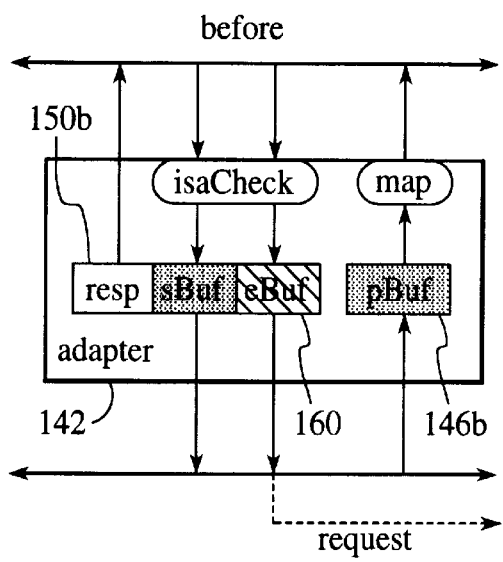
FIGS. 25a and 25b are block diagrams showing the processing of queued split-request by the lower-level adapter.
Figure 25B:
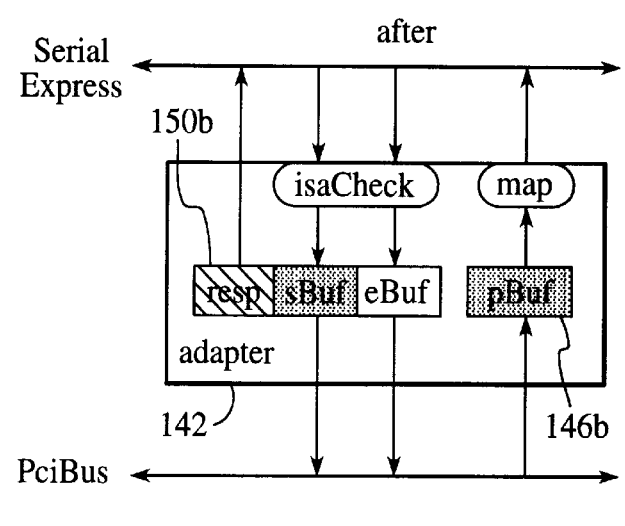

FIGS. 25a and 25b are block diagrams showing the processing of queued split-request by the lower-level adapter. An eBuf-queued SerialExpress requests is processed and transmitted over the PCI bus when the resp queue is empty, and has precedence over the servicing of incoming-request queue entries, as shown in FIG. 25a. The processing of sBuf entries depends on the opposing pBuf-queue state. Successful processing converts the sBuf-queued request into a resp-queued response that is transmitted over the SerialExpress bus, as illustrated in FIG. 25b.

FIG. 26 is a table describing the rules the lower-level PCI adapter follows when processing eBuf-queued SPLIT-labeled requests.

Row1: The processing of the passive eBuf-queued request is delayed, and is not changed to active, until a previously-queued sBuf-posted write (if any) completes. This delay is mandated by posted-write/request-ordering constrains.

Row2: The processing of the passive eBuf-queued request is allowed, in the absence of an sBuf-posted write, and involves changing the sBuf mode from passive-to-active. Processing is further delayed until PCI bus arbitration succeeds.

Row3: The servicing of this active eBuf-queued read involves the initiation of a PCI bus transaction. The eBuf state is unchanged while the PCI bus read is busied. When the PCI bus transaction completes, the eBuf-queued request is converted into a PASS-status response (or FAIL-status, if a PCI bus-error condition is reported). The response is marked passive, to delay its processing, as mandated by posted-write/read-response ordering constraints.

Row4: The servicing of this active eBuf-queued read involves the initiation of a PCI bus transaction, as described for Row3. However, the absence of an pBuf-posted allows the read response to be marked active.

Row5: The servicing of an active eBuf-queued write involves the initiation of a PCI bus transaction, as described for Row3. However, a write response isn't affected by pBuf state and is therefore marked active.

Row6: The servicing of passive response is delayed, to enforce posted-write/read-response ordering constraints. The passive state is changed to active when there is no pBuf-posted write.

Row7: An active response allows the SerialExpress transaction to be completed: the response is returned to the Serial Express requester and the eBuf entry is deleted.

Higher-level PCI Adapter Operation

The rules provided below apply to higher-level PCI adapter operation. The rules for higher-level SerialExpress request queuing are similar to the rules for lower-level SerialExpress request queuing. That is, SerialExpress requests are placed into an incoming-request queue (not shown) before being processed by a higher-level PCI adapter. When the incoming-request queue becomes full (a transient condition) busy/retry protocols inhibit the acceptance of additional incoming-request queue entries. Processing of incoming-request queue entries is inhibited until the resp queue is empty, since request processing may generate a response.

Depending on adapter state, the incoming request may be queued in sBuf for delayed processing, or may be converted into a response and saved in the resp queue.

FIGS. 27a and 27b are block diagrams showing the components of a higher-level PCI adapter 140 when accepting a SerialExpress request. Notice that in the higher-level PCI adapter 140, the isaCheck hardware 160a has been disabled, since only full duplex accesses are allowed. The request is received from the SerialExpress bus by the higher-level PCI adapter 140 in FIG. 31a, and then queued in sBuf 148a for delayed processing as shown in FIG. 31b.

Figures 28A, 28B, 29:
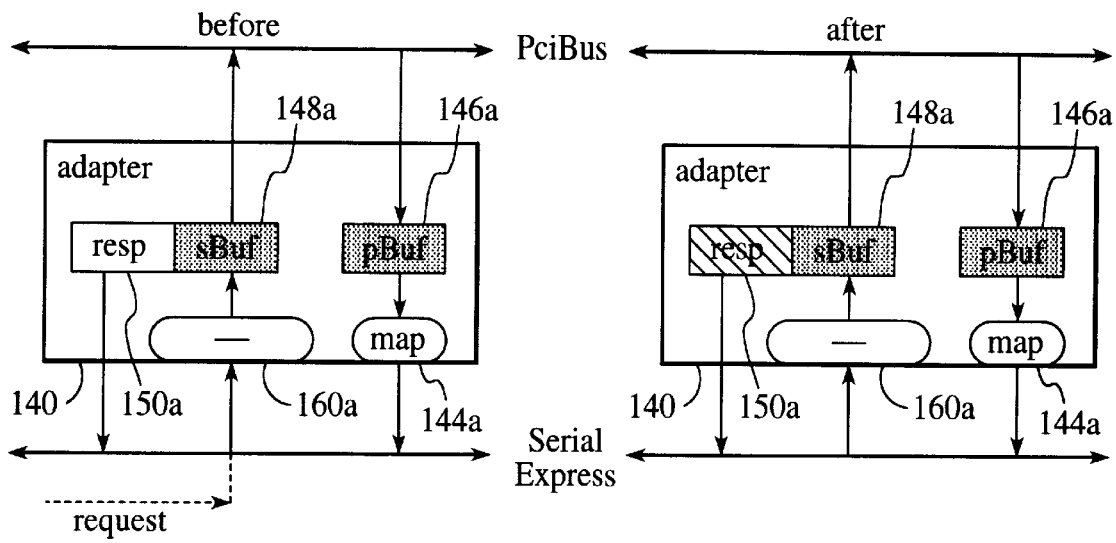
FIGS. 28a and 28b are block diagrams showing the components of a higher-level PCI adapter when rejecting a SerialExpress request.
FIG. 29 is a table describing the rules the higher-level PCI adapter follows when processing incoming SerialExpress request subactions.

FIGS. 28a and 28b are block diagrams showing the components of a higher-level PCI adapter when rejecting a SerialExpress request. The request is received by the higher-level PCI adapter in FIG. 28a, and then converted into a response and saved in the resp queue, as shown in FIG. 28b. The response is then sent out on the SerialExpress bus with a CONFLICT status.

FIG. 29 is a table describing the rules the higher-level PCI adapter follows when processing incoming SerialExpress request subactions.

Row11: The servicing of the incoming-request queue is deferred if there is no opposing conflict, since incoming requests can be safely busied until the sBuf entry is emptied by the normal request/response processing steps. Note that sBuf-queue processing converts requests from the active-to-passive mode when opposing conflicts are detected.

Row2: In the normal case (the sBuf queue is empty) the incoming-request queue entry is transferred into the previously empty sBuf queue and marked active.

Row3: While sBuf is passive (indicating there is an opposing pBuf conflict) each incoming request-queue entry is converted into CONFLICT-status response and placed into the resp queue. Rejection of these conflicting requests avoids queue-usage deadlocks.

Row4: Requests with an inconsistent precedence level (not MID) are rejected by converting the request into a FAULT-status response, so the requester can be informed of this level-precedence inconsistency error.

Higher-level SerialExpress Request Servicing

After a SerialExpress request has been queued, the processing of sBuf-queued SerialExpress requests occurs when the resp queue is empty. This processing of sBuf entries has precedence over the servicing of incoming-request queue entries, but depends on the opposing pBuf-queue statue.

FIGS. 30a and 30b are block diagrams depicting higher-level SerialExpress request servicing. Successful processing converts the sBuf-queued request, shown in FIG. 30a, into a resp-queued response, as illustrated in FIG. 30b.

FIG. 31 is a table describing the rules the higher-level PCI adapter follows when processing sBuf-queued requests.

Row1: The posting of sBuf-queued writes is delayed, while there is an pBuf-queued read. This delay, which changes sBufs mode to passive, is mandated by posted-write/read-response ordering constraints.

Row2: The processing of an sBuf-queued read is delayed by a lower-precedence pBuf-queued read, since PCI bus is occupied. This delay, which changes sBuf's mode to passive, terminates when pBuf is emptied.

Row3: The sBuf-queued write can be posted unless there is an opposing pBuf-queued read. To post such a write, 1) a completion response is placed in the resp queue and 2) the sBuf-queued write mode is changed to posted.

Row4: The servicing of an sBuf-posted write involves the initiation of PCI bus transaction; the sBuf-write state remains unchanged while the PCI bus write is busied. When PCI bus write completes, the sBuf-posted write is discarded; if a PCI bus-error condition is reported, an error bit may be set in the adapter.

Row5: An sBuf-posted write with an opposing pBuf read is a fatal error condition that (in the absence of a hardware failure) never occurs. This condition would violate posted-write/read-response ordering constraints.

Row6: The sBuf-queued read has lower precedence than an opposing pBuf-posted write, and is therefore rejected. Rejection consists of converting the request into a CONFLICT-status response and placing that response into the resp queue. This CONFLICT response provides a FULL indication Row7: The Mid-precedence sBuf-queued read has lower precedence than an opposing pBuf-queued readMax request and is therefore rejected.

Row8: Any sBuf-queued read can be forwarded to PCI bus when there is no opposing pBuf-queued request. Processing of this request involves initiation of a PCI bus transaction; the state of the sBuf-queued read is unchanged while the PCI bus transaction is busied. When the PCI bus transaction completes, the sBuf-queued request is converted into a PASS-status response (or FAIL-status, if a PCI bus-error condition is detected) and placed in the resp queue.

Higher-level PCI Bus Request Queuing

Figures 32A, 32B, 33:
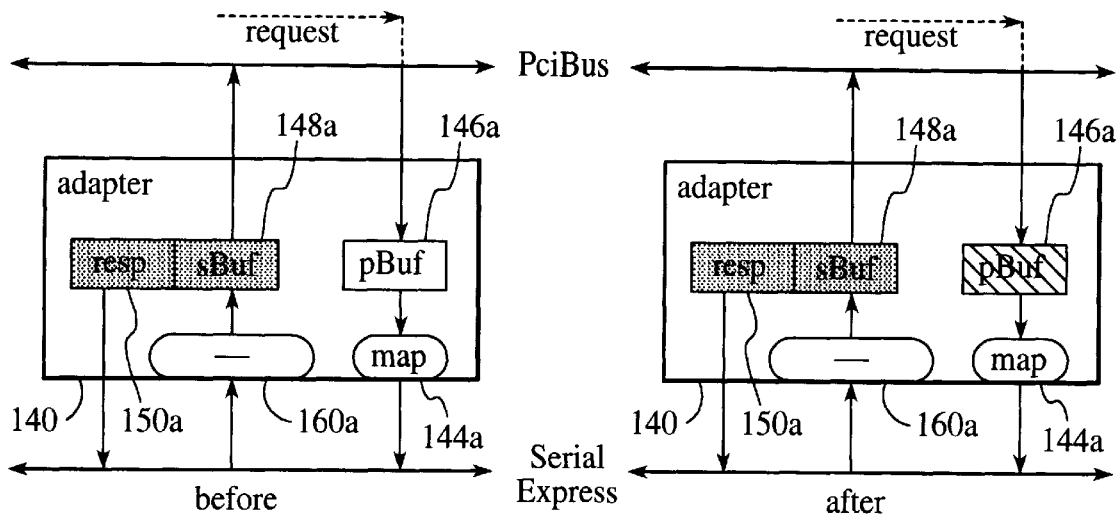
FIGS. 32a and 32b are block diagrams illustrating the queuing of PCI bus requests by high level PCI-adapter.
FIG. 33 is a table describing the acceptance rules for PCI bus reads and write request that are followed by the higher-level PCI.
Figure 36:
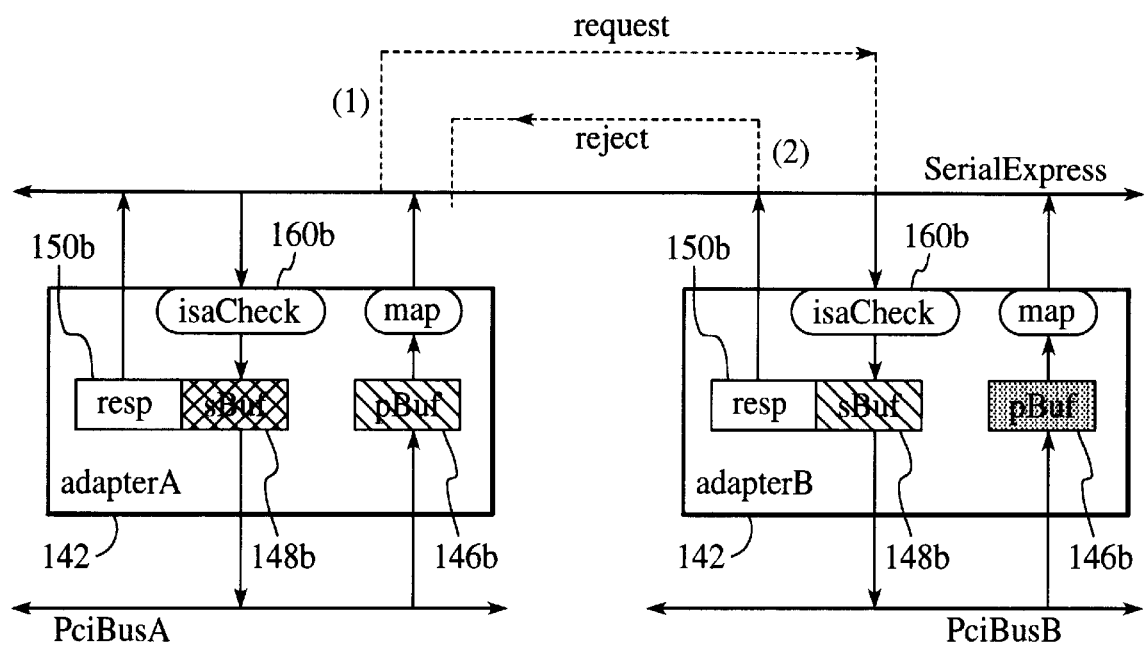
FIGS. 36–41 are block diagrams illustrating the precedence rules applied to posted-write requests in a same-level PCI bus topology.
Figure 37:
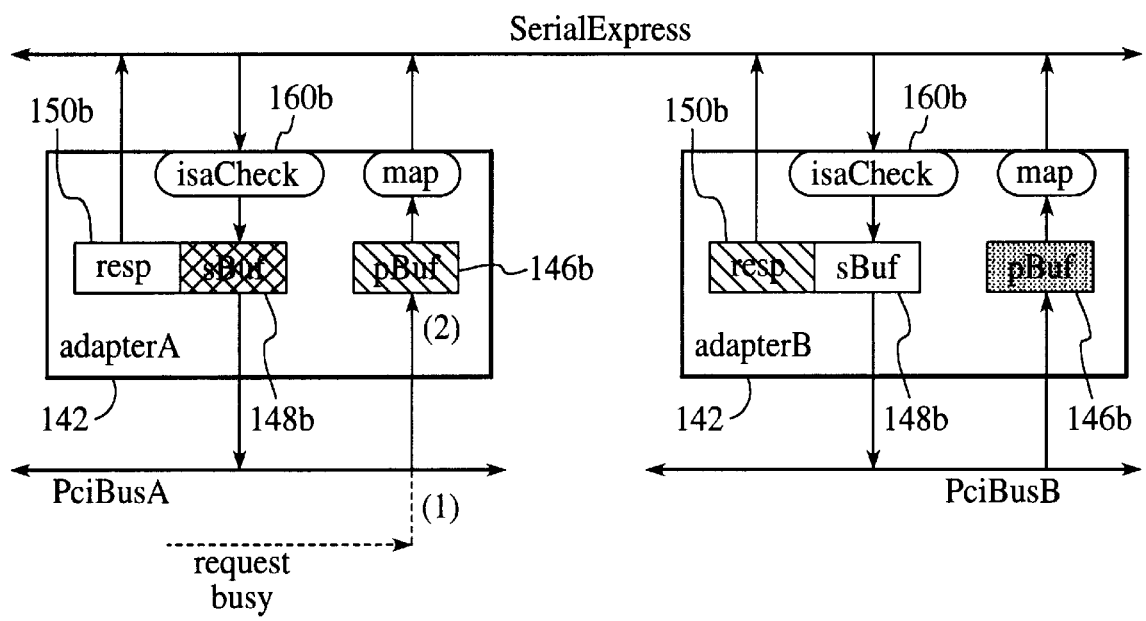
Figure 38:
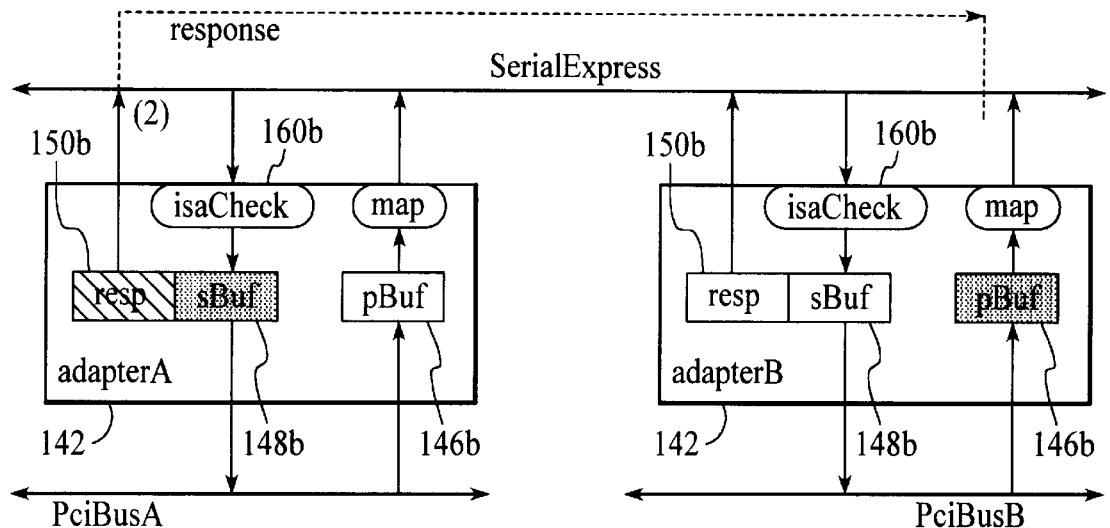
Figure 39:
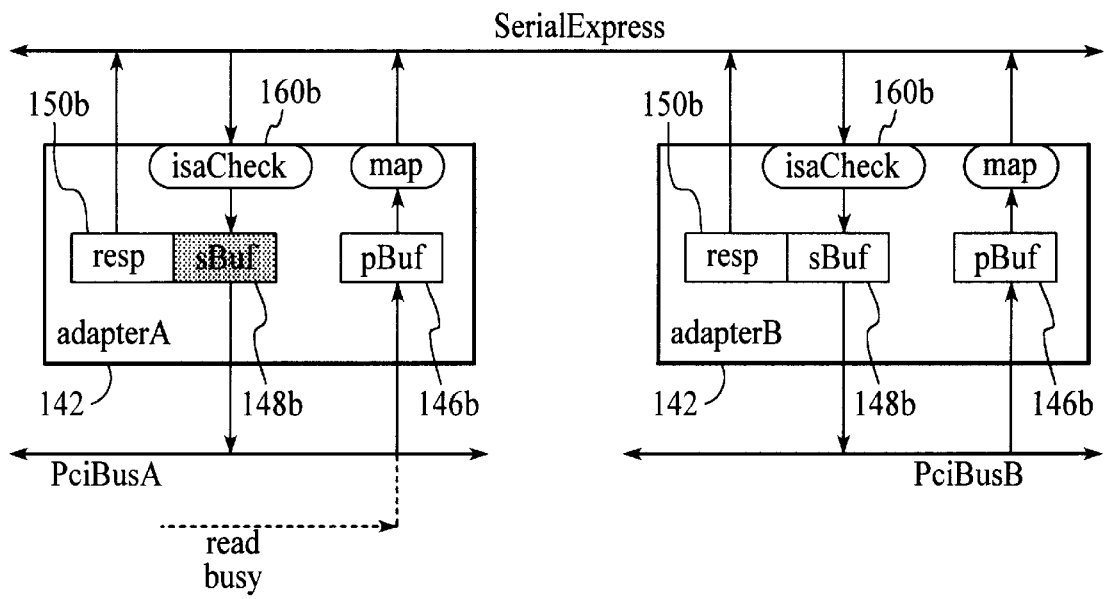

FIGS. 32a and 32b are block diagrams illustrating the queuing of PCI bus requests by high level PCI-adapter. In FIG. 32a, a request is received from the PCI bus and checked by PCI-adapter hardware. This conditionally activates pBuf processing, as illustrated in FIG. 32b. The busy/retry protocols inhibit the acceptance of incoming PCI bus requests during conflicts as well as transient queue-full conditions. A PCI bus write isn't posted into pBuf storage because the address's half/full-duplex capability is initially unknown.

FIG. 33 is a table describing the acceptance rules for PCI bus reads and write request that are followed by the higher-level PCI. If these conditions are not met, the request is busied and the pBuf state remains unchanged.

Row1: a PCI bus read is processed, rather than busied, unless there is a sBuf-posted write. Processing involves activating the pBuf entry, sending a SerialExpress request, and extending the PCI bus transaction until the expected SerialExpress response is received/processed.

Row2: a PCI bus write is processed, rather than busied, if pBuf is empty. The PCI bus write is switched, rather than posted, until the full-duplex nature of the transaction address hasn't been confirmed.

Higher-level SerialExpress Response Processing

FIGS. 34a and 34b are block diagrams illustrating the processing of response requests received by the high-level PCI-adapter from the SerialExpress. When a SerailExpress response to a previous request is returned to the adapter, as shown in FIG. 34a, the processing of the response changes the adapter's pBuf state, typically completing the currently active pBuf-queued transaction, as illustrated in FIG. 34b.

FIG. 35 is a table describing the rules the higher-level PCI adapter follows when processing SerialExpress responses and their affiliated pBuf-queued requests.

Row1: a pBuf-queued write is posted when a CONFLICT-FULL status is returned, since the full-duplex nature of the PCI bus address has been confirmed. Posting involves completion of the PCI bus write and changing the pBuf-queued write from active-to-posted.

Row2: a pBuf-queued write is resent as switched write if a CONFLICT-HALF status is returned and there is no opposing sBuf-queued conflict.

Row3: a pBuf-posted write has the highest request and is therefore resent whenever a CONFLICT-FULL status is returned.

Row4: The pBuf-posted write completes and pBuf is marked empty, if a COMPLETE-status response is returned.

Row5: The pBuf-posted write is emptied if a CONFLICT-HALF status response is returned. An error bit is set in the adapter, to log this completion-error condition. The effects of this error bit are vendor dependent and expected to be fatal.

Row6: a pBuf-queued read is resent if a CONFLICT-FULL status is returned and there is no opposing write conflict. The read is resent as readMax, since the full-duplex nature of the PCI bus address has been confirmed.

Row7: a pBuf-queued readMin is resent if a CONFLICT-HALF status is returned and there is no opposing request conflict. The precedence isn't increased, since the half-duplex nature of the PCI bus address has been confirmed.

Row8: a pBuf-queued read is busied if a CONFLICT-FULL status is returned and there is an opposing sBuf-queued write conflict. This allows the sBuf-queued write to be posted.

Row9: a pBuf-queued readMin or writeMin is busied if a CONFLICT-HALF status is returned and there is an opposing conflict. This allows the Mid-precedence sBuf-queued request to be completed.

Row10: a pBuf-queued request completes when a COMPLETE status is returned. The extended PCI bus transaction is allowed to complete normally and pBuf is marked empty.

Row11: a pBuf-queued readMax or writeMax is terminated when a CONFLICT-HALF status is returned, since this violates hierarchy-precedence rules. The pBuf queue is marked empty and the PCI bus transaction is allowed to complete, but an error-acknowledge code is asserted.

Row12: An sBuf-posted write can never exist when an opposing pBuf read is active. If allowed to occur, this would violate posted-write/read-response ordering constraints.

The following sections of this description are conflict resolution examples that further describe how the PCI-adapter queues in conjunction with the precedence-based rules described above, are used to ensure that at least one request will be processed during conflicts in a split-response multiprocessor computer system.

Posted-write Precedence

As stated above, the precedence rules provide posted write request with precedence over other requests. This inhibits the progress of opposing read transactions when resolving bus-usage conflicts.

FIGS. 36–41 are block diagrams illustrating the precedence rules applied to posted-write requests in a same-level PCI bus topology. Similar rules apply for hierarchical PCI adapters. In this example, a PciBusB write has been pBuf-posted in adapterB. The write request has been forwarded to and queued in adapterA's sBuf queue, but has not been posted due to an opposing PciBusA read request that is active in adapterA's pBuf. The pBuf-queued read generates an affiliated SerialExpress request subaction that is being forwarded (1) to adapterB's sBuf queue. AdapterB's pBuf-posted write forces a rejection of the opposing sBuf request (2).

Figure 40:
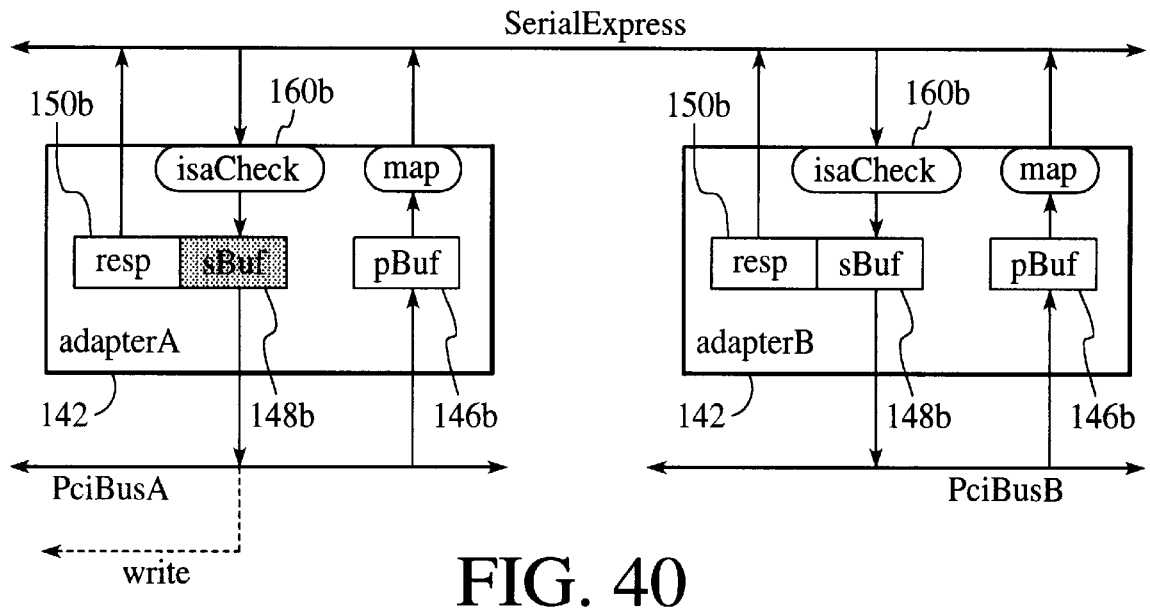

Referring to FIG. 40, adapterA's pBuf rejection causes the PciBusA request to be busied (1) when its pBuf is emptied (2).

Figure 41:
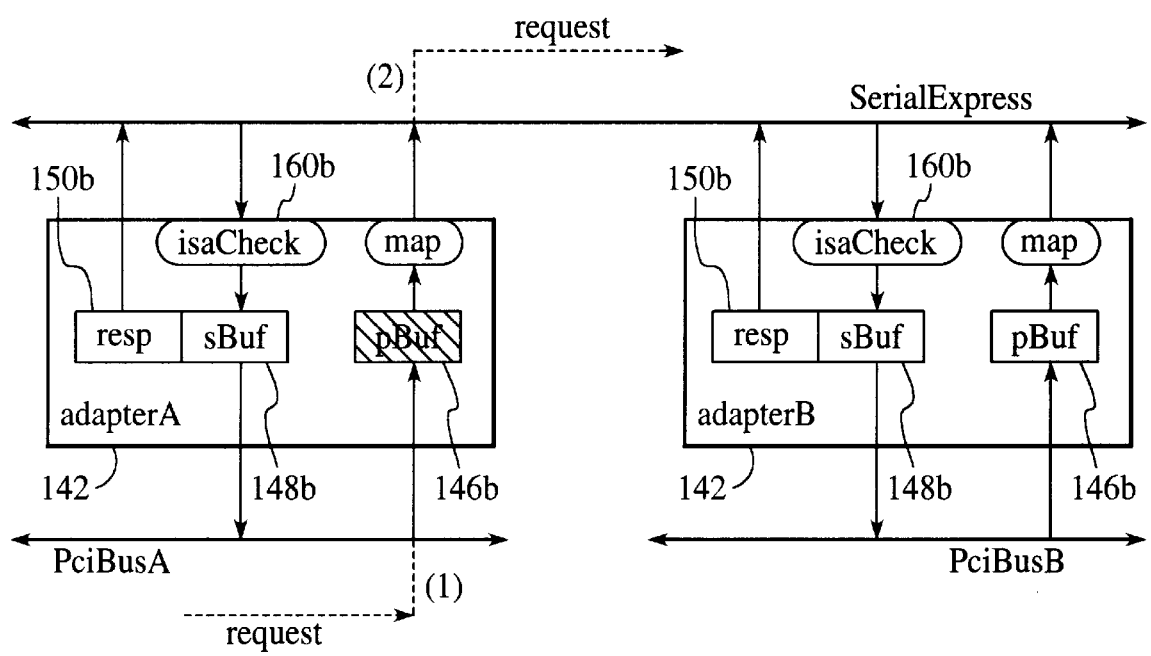

Referring to FIG. 41, after its opposing read conflict disappears, adapterA's sBuf entry can be posted (1), causing a response to be returned (2) to adapterB. This returned response allows the adapterB pBuf-posted write to complete (3).

Figure 42:
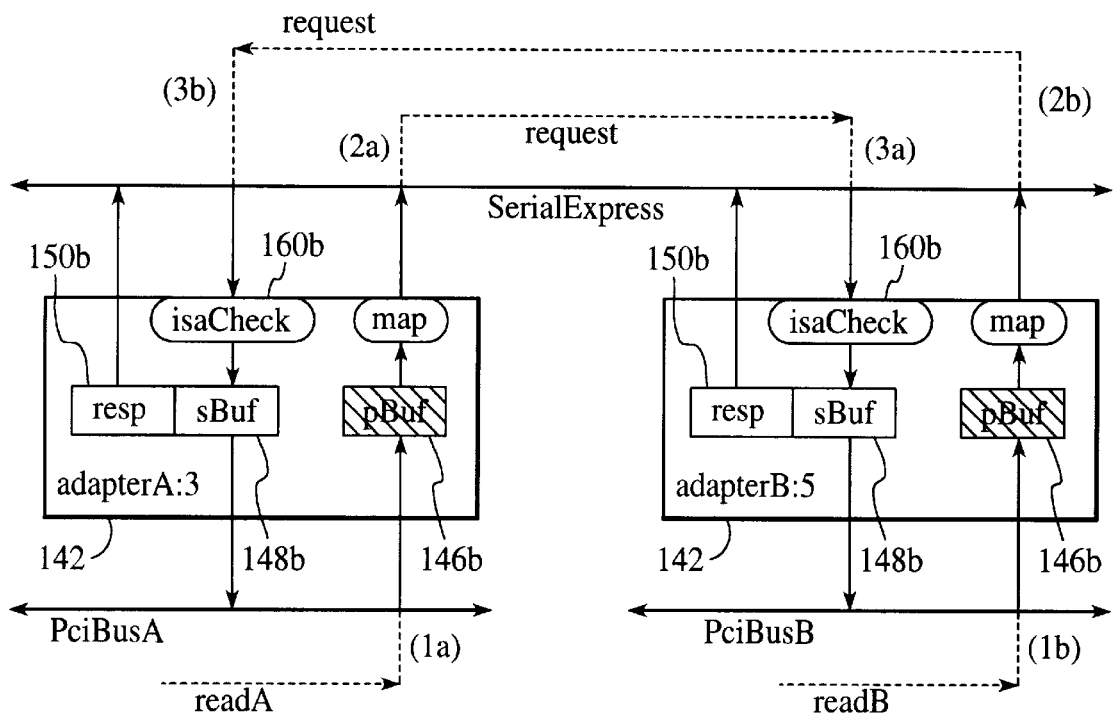
FIGS. 42–45 are block diagrams illustrating the precedence rules applied in a PCI bus topology to resolve same-level read-read conflicts.

Referring to FIG. 42, while adapterA is arbitrating for PciBusA access, incoming PciBusA reads are busied. These reads cannot be accepted, because (on adapterA) the completion of a pBuf-queued read would allow the read response to bypass the sBuf-posted write. If allowed to happen, this would violate one of the posted-write ordering constraints.

Figure 43:
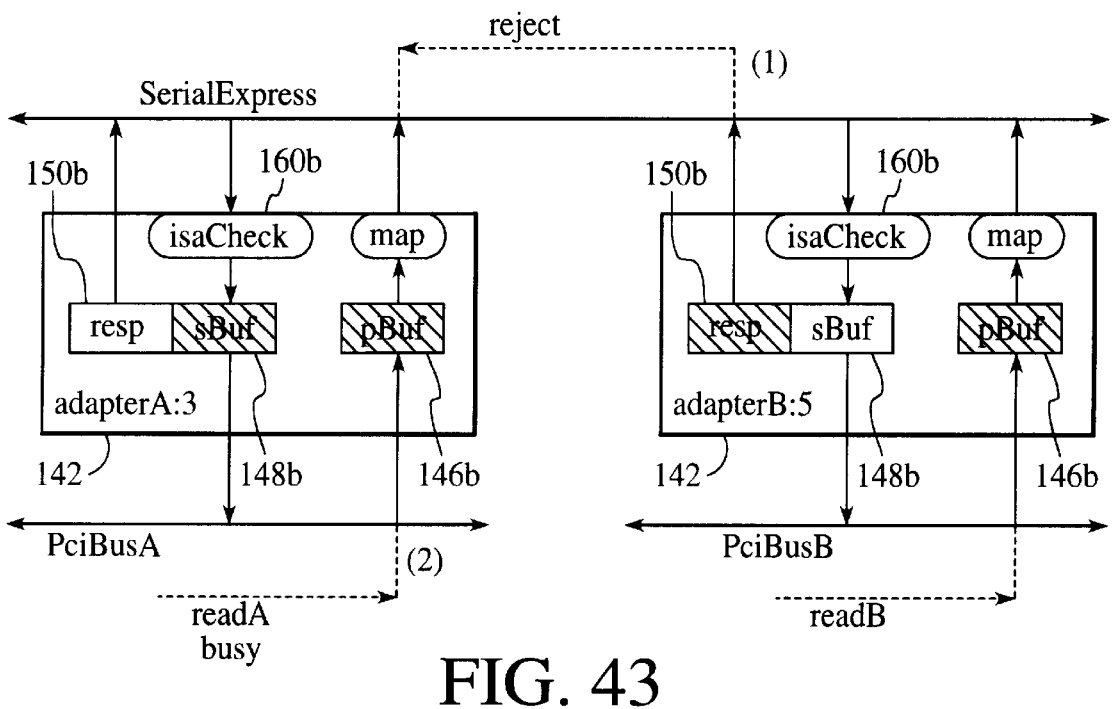

Referring to FIG. 43, after adapterA's PciBusA arbitration succeeds, its sBuf-posted write can complete. If adapterA's sBuf-posted PciBusA write is busied, the write is retried until completed.

Figure 44:
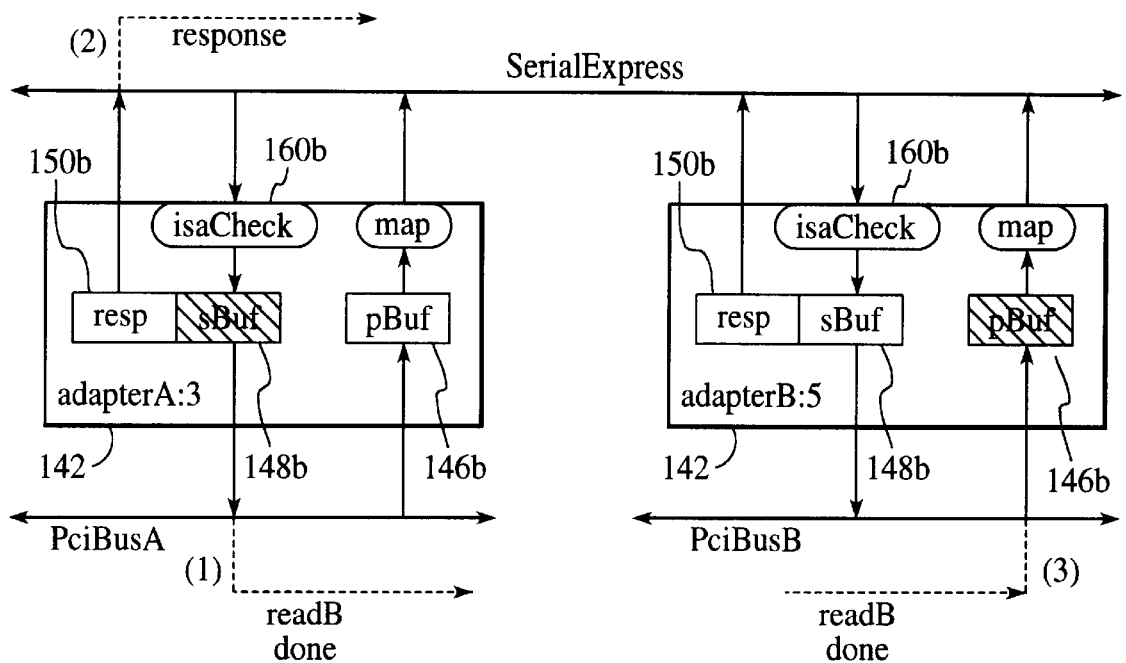

Referring to FIG. 44, the PciBusA read can then be retried (1) on PciBusA, in which case the read is passed into adapterA's pBuf, and its affiliated SerialExpress request subaction sent towards PciBusB (2).

Level Read-read Conflicts

Figure 45:
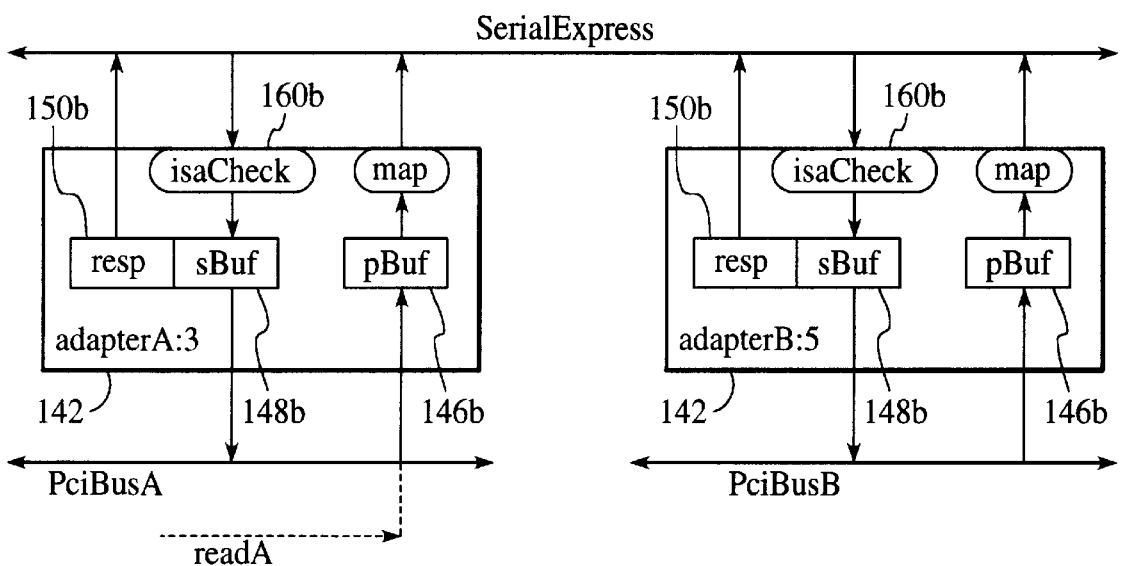

FIGS. 42–45 are block diagrams illustrating the precedence rules applied in a PCI bus topology to resolve same-level read-read conflicts. As illustrated in FIG. 45, a lower-level read-read conflict can be generated when PciBusA and PciBusB attempt to simultaneously access each other. In this example, the PciBusA/PciBusB reads are initiated concurrently (1a and 1b) and both of their resulting Serial Express requests (2a, and 2b) are sent before either of the Serial Express requests is received (3a and 3b).

The symmetry of these reads, both of which have the save level-precedence, requires the use of ID-precedence (comparisons of nodeIds) to determine which of these conflicting read requests are busied.

Referring to FIG. 46, the read request on adapterA is not rejected, because 1) adapterA's nodeId (three) is less than the sourceId (five) of its sBuf read and 2) adapterA's nodeId is less than the targetId of its pBuf-queued read. The request on adapterB doesn't have these properties, so its sBuf-queued request is rejected (1), causing PciBusA's readA transaction to be busied (2). AdapterA's queued sBuf request causes the rejection of readA retries and other lower-precedence PciBusA-to-SerialExpress reads (not shown) while adapterA's sBuf-queued read remains queued.

Referring to FIG. 47, after adapterA's arbitration succeeds, a readB transaction is attempted (1) on PciBusA. If completed (rather than busied), a response is returned (2) to adapterB and the readB read completes on PciBusB (3).

And finally, referring to FIG. 48, completion of the readB PciBusB-to-PciBusA transaction allows the readA PciBusA-to-PciBusB transaction to progress.

A method and system for avoiding starvation and deadlocks in a split-response multiprocessor computer system has been disclosed. The precedence information included with packets provides a way to resolve message-queue conflicts using time, a way to avoid rejections using SPLIT labels, a way to resolve MID conflicts using node Id's, and a way to resolve hierarchy conflicts through MAX/MIN labels. Furthermore, having the responder provide FULL/HALF states to allow the requester to change its request label from MIN to MAX eliminates the need to provide an additional (and typically more complex) set of duplex-checking registers in the higher-level PCI adapter nodes, which simplifies their design.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for avoiding split-response-bus conflicts in a multiprocessor computer system, the multiprocessor computer system including a first node and a second mode coupled to the split-response bus, wherein the first and second nodes communicate by passing request packets over the split-response bus, wherein the first node is a requesting node, further wherein the multiprocessor system includes a PCI adapter having a node Id coupled to a split-response and to a PCI bus, the PCI adapter operable to detect a read request conflict when a split-response-to-PCI-BUS read request is received while a PCI-BUS-to-split-response read request is active, each of the read requests including a source Id and a target Id, the method including the steps of:

(a) providing precedence information in the request packets, wherein the multiprocessor system includes a particular topology, step (a) further including the step of:

(a1) providing the precedence information by including a precedence label in the request packets indicating where the requesting node is located in the topology of multiprocessor system; and (b) using the precedence information upon receiving the request packets to determine which request packets to process and which request packets to reject when a conflict occurs (c) performing conflict resolution by rejecting the received read request at the adapter unless I) the adapter node Id is less than the source Id within the received read-request, and ii) the adapter node Id is less than the target Id of the active read request.

2. A method as in claim 1 wherein step (a) further includes the steps of:

(a2) providing a first precedence label that indicates the requesting node is a split-response requestor;

(a3) providing a second precedence label that indicates the requesting node is a higher-level requestor in a bus hierarchy;

(a4) providing a third precedence label that indicates the requesting node is same-level requester; and (a5) providing a fourth precedence label that indicates the requesting node is a lower-level requester.

3. A method as in claim 2 wherein the first precedence label is SPLIT, the second precedence label is MIN, the third precedence label is MID, and the fourth precedence label is MAX.

4. A method as in claim 3, wherein step (a) further includes the step of:

(a6) labeling requests as MIN, MID, and MAX in order to resolve hierarchical conflicts.

5. A method as in claim 4, wherein the detected read request conflict is caused by same-level read requests, step (c) further including the step of:

(c1) providing same-level read requests with the MID label.

6. A method as in claim 5, wherein step (c) further includes the step of:

(c2) sending a reject response from the PCI adapter after rejecting a read request;

(c3) indicating in the reject response whether the read request was attempting to access a half-duplex address or a full-duplex address;

(c4) in response to the reject response indicating a half-duplex address, providing a resent request with the MIN precedence label; and (c5) in response to the reject response indicating a full-duplex address, providing a resent request with a MAX precedence label.

7. A multiprocessor computer system for avoiding starvation and deadlocks, comprising:

a split-response-bus;

a first node and a second node coupled to the split-response bus, wherein the first and second nodes communicate by passing request packets over the split-response; wherein the first node is a requesting node;

precedence means for providing precedence information in the request packets, wherein the multiprocessor system includes a particular topology, wherein the precedence means provides a precedence label in the request packets indicating where the requesting node is located in the topology of multiprocessor system;

means for determining which request packets to process during a conflict and which request packets to reject based on the precedence information;

a PCI bus; and a PCI adapter having a node Id coupled to a split-response and to the PCI bus, wherein the PCI adapter detects a read request conflict when a split-response-to-PCI- BUS read request is received while a PCI-BUS-to-split-response read request is active, each of the read requests including a source Id and a target Id, the adapter further including means for performing conflict resolution by rejecting the received read request at the adapter unless I) the adapter node Id is less than the source Id within the received read-request, and ii) the adapter node Id is less than the target Id of the active read request.

8. A system as in claim 7, wherein the precedence means provides a first precedence label that indicates the requesting node is a split-response requestor, provide a second precedence label that indicates the requesting node is a higher-level requester in a bus hierarchy, provides a third precedence label that indicates the requesting node is a same-level requester, and provides a fourth precedence label that indicates the requesting node is a lower-level requester.

9. A system as in claim 8, wherein the first precedence label is SPLIT, the second precedence label is MIN, the third precedence label is MID, and the fourth precedence label is MAX.

10. A system as in claim 9, wherein the precedence means labels requests as MIN, MID, and MAX in order to resolve asymmetric hierarchical conflicts.

11. The system as in claim 10, wherein the detected read request conflict is caused by same-level read requests, and the same-level read requests are provided with the MID labels.

12. A system as in claim 10, wherein the adapter sends a reject response from the PCI adapter after rejecting a read request, the reject response indicating whether the read request was attempting to access a half-duplex address or a full-duplex address, wherein in response to the reject response indicating a half-duplex address, a requesting node resends the request with the MIN precedence label, and wherein in response to the reject response indicating a full-duplex address, the requesting node resends the request with a MAX precedence label.

* * * * *